United States Patent
Kim et al.

(10) Patent No.: US 8,112,299 B2
(45) Date of Patent: Feb. 7, 2012

(54) MOBILE TERMINAL CAPABLE OF MANAGING SCHEDULE AND METHOD OF CONTROLLING THE MOBILE TERMINAL

(75) Inventors: Jong Hwan Kim, Seoul (KR); Hyun Bo Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 360 days.

(21) Appl. No.: 12/334,317

(22) Filed: Dec. 12, 2008

(65) Prior Publication Data

US 2010/0030612 A1    Feb. 4, 2010

(30) Foreign Application Priority Data

Aug. 1, 2008   (KR) .................. 10-2008-0075676

(51) Int. Cl.
   *G06Q 10/00*   (2006.01)
   *G01C 21/00*   (2006.01)
   *G01C 21/30*   (2006.01)

(52) U.S. Cl. ............ 705/7.18; 705/7.16; 705/7.19; 701/200; 701/201; 701/202; 701/206; 701/207; 701/208; 701/213; 715/963

(58) Field of Classification Search .................. None
   See application file for complete search history.

(56) References Cited

U.S. PATENT DOCUMENTS

| | | | | |
|---|---|---|---|---|
| 7,075,512 B1* | 7/2006 | Fabre et al. | .......... | 345/156 |
| 7,902,997 B2* | 3/2011 | Stehle et al. | .......... | 340/905 |
| 2002/0022923 A1* | 2/2002 | Hirabayashi et al. | ......... | 701/200 |
| 2003/0004776 A1 | 1/2003 | Perrella et al. | | |
| 2005/0216184 A1* | 9/2005 | Ehlers | .......... | 701/200 |
| 2007/0055561 A1* | 3/2007 | Perrella et al. | .......... | 705/9 |
| 2007/0067104 A1* | 3/2007 | Mays | .......... | 701/211 |
| 2007/0143010 A1* | 6/2007 | Jensfelt | .......... | 701/208 |
| 2007/0174770 A1* | 7/2007 | Safoutin | .......... | 715/700 |
| 2007/0250257 A1* | 10/2007 | Almy | .......... | 701/200 |

(Continued)

FOREIGN PATENT DOCUMENTS

EP    1 909 069 A1    4/2008

(Continued)

OTHER PUBLICATIONS

"Apispheere for Outlook Plug-In Tapped as Best-In-Class Winner in Sierra Wireless—wavefront Developer Program" (Jan. 4, 2008), Wireless News.*

(Continued)

*Primary Examiner* — Lynda Jasmin
*Assistant Examiner* — Sujay Koneru
(74) *Attorney, Agent, or Firm* — Birch, Stewart, Kolasch & Birch, LLP

(57) ABSTRACT

A mobile terminal capable of managing schedule and a method of controlling the mobile terminal are provided. In order to register a new scheduled event to the mobile terminal, a schedule place corresponding to the new scheduled event may be displayed on a schedule map. Thereafter, a route between the schedule place and other routes may be established in consideration of a current location of the mobile terminal and traffic information. The clarity, color and/or shape of objects displayed on the schedule map may be changed in consideration of the current location of the mobile terminal or the traffic information. Therefore, a user may easily obtain various schedule information, current location information and traffic condition information from the schedule map.

44 Claims, 20 Drawing Sheets

U.S. PATENT DOCUMENTS

| | | |
|---|---|---|
| 2007/0271031 A1 | 11/2007 | Jung et al. |
| 2008/0045173 A1* | 2/2008 | Park et al. ................... 455/187.1 |
| 2008/0046471 A1* | 2/2008 | Moore et al. ............... 707/104.1 |
| 2008/0109718 A1 | 5/2008 | Narayanaswami |
| 2008/0139245 A1 | 6/2008 | Huh et al. |
| 2008/0167937 A1* | 7/2008 | Coughlin et al. .................. 705/9 |
| 2008/0208449 A1* | 8/2008 | Jung et al. ..................... 701/201 |
| 2009/0006994 A1* | 1/2009 | Forstall et al. ................. 715/764 |
| 2009/0100018 A1* | 4/2009 | Roberts ............................. 707/3 |

FOREIGN PATENT DOCUMENTS

| | | |
|---|---|---|
| WO | WO-2008/083273 A2 | 7/2008 |

OTHER PUBLICATIONS

GPS Lodge (Jun. 2008) www.gpslodge.com.*

"GPS software for cell phones" (Nov. 2008) www.gps-practice-and-fun.com.*

* cited by examiner

FIG. 10
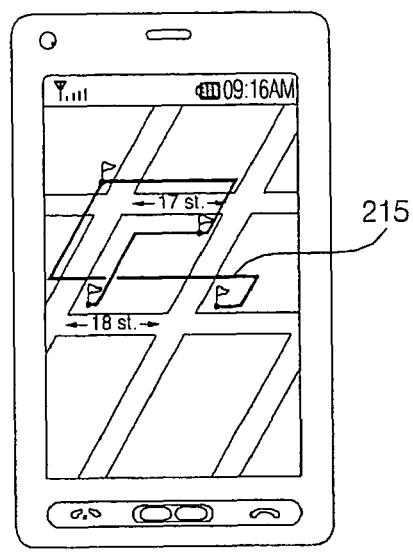 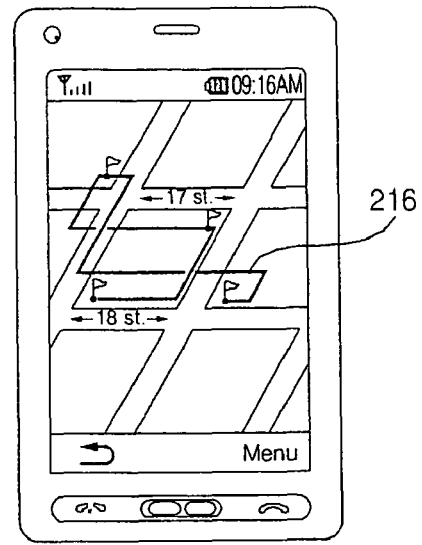
(a)　　　　　　　　　　　　(b)
FIG. 11
(a) 
(b) 
(c) 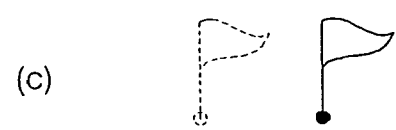

(a)   (b)

FIG. 14
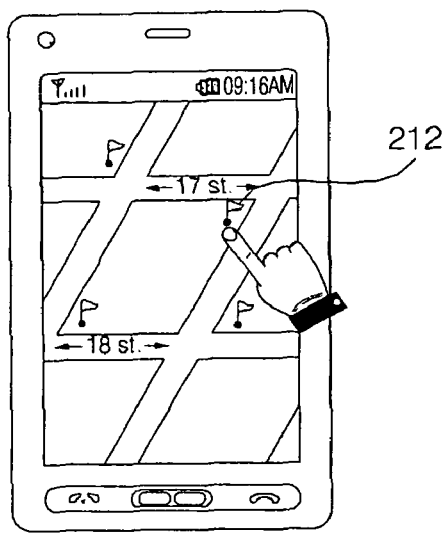
(a)
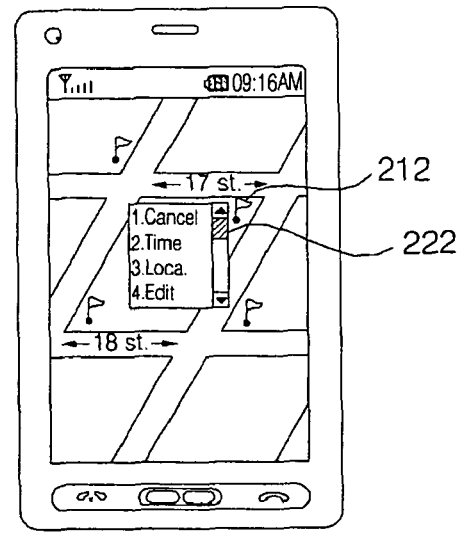
(b)
FIG. 15
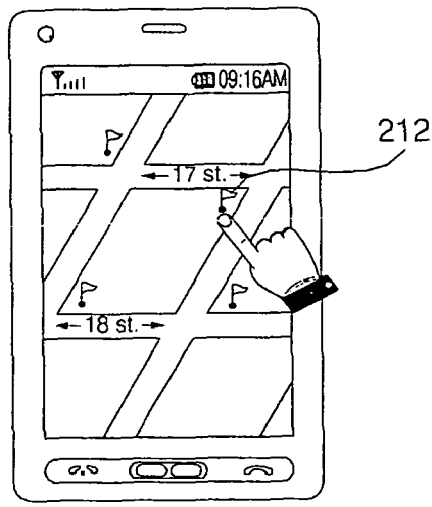
(a)
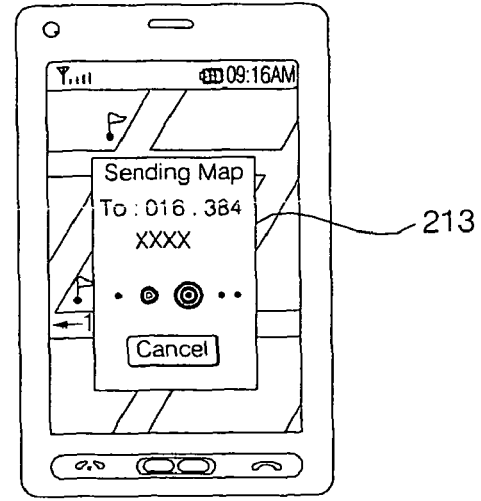
(b)

FIG. 16
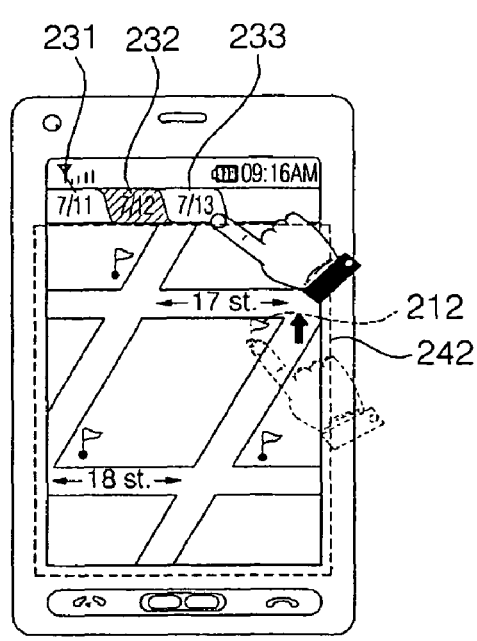
(a)
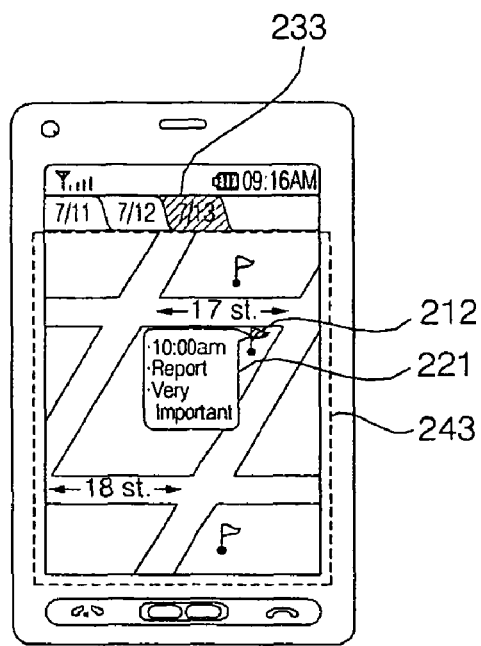
(b)

(a) (b)

(a) (b)

FIG. 20
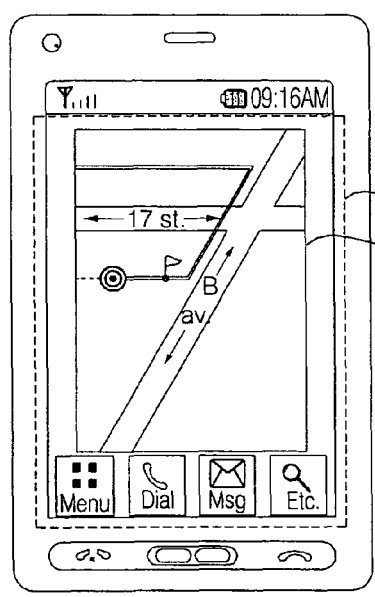
(a)
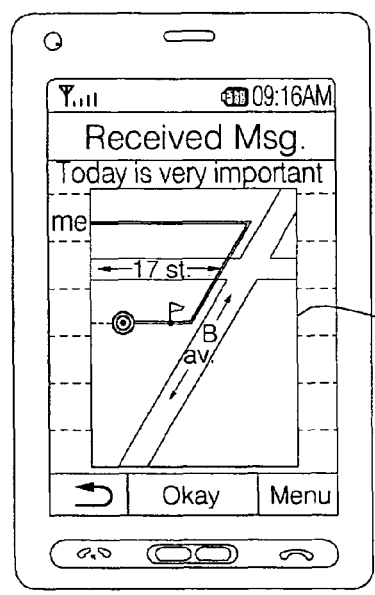
(b)

(a)          (b)

MOBILE TERMINAL CAPABLE OF MANAGING SCHEDULE AND METHOD OF CONTROLLING THE MOBILE TERMINAL

CROSS REFERENCE TO RELATED APPLICATIONS

The present application claims the benefit of Korean Application No. 10-2008-0075676, filed on Aug. 1, 2008 in the Korean Intellectual Property Office, the disclosure of which is incorporated herein by reference.

BACKGROUND OF THE INVENTION

1. Field of the Invention

The present invention relates to a mobile terminal capable of managing schedule and a method of controlling the mobile terminal, and more particularly, a mobile terminal capable of managing schedule by using a map and a method of controlling the mobile terminal.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, and receiving broadcast programs and have thus evolved into multimedia players.

Various attempts have been made to realize such complicated functions as hardware devices or software programs. For example, various user interface environments, in which users are allowed to easily search for and choose desired functions, have been developed.

In the meantime, the demand for various designs for mobile terminals has steadily grown due to a growing tendency of considering mobile terminals as personal items that can represent users' personality.

There is a restriction in allocating sufficient space for a user interface (UI) device (such as a display device or a keypad) of a mobile terminal without compromising the mobility and the portability of a mobile terminal. Therefore, it is necessary to develop ways to allow users to control the operation of mobile terminals using a new data input/output method and thus to efficiently use various functions of mobile terminals without the need to wander from one menu to another menu of a complicated menu structure.

SUMMARY OF THE INVENTION

The present invention provides a mobile terminal, which displays a schedule map showing a number of schedule places and thus enables a user to easily learn schedule information from the schedule map, and a method of controlling the mobile terminal.

The present invention also provides a mobile terminal, which displays a schedule map showing a number of schedule places, displays various routes between the schedule places on the schedule map and alters the color of objects displayed on the schedule map according to the location of the mobile terminal and traffic information.

According to an aspect of the present invention, there is provided a method of controlling a mobile terminal capable of managing schedule, the method including identifying schedule time information corresponding to at least one schedule place included in a schedule list; obtaining current location information or traffic information; and determining whether a user can arrive at the schedule place in time based on the current location information or the traffic information and displaying schedule notification information or schedule adjustment information in a display region according to the results of the determination.

According to another aspect of the present invention, there is provided a mobile terminal capable of managing schedule, the mobile terminal including a display region; and a control unit which identifies schedule time information corresponding to at least one schedule place included in a schedule list, obtains current location information or traffic information, determines whether a user can arrive at the schedule place in time based on the current location information or the traffic information and displays schedule notification information or schedule adjustment information in a display region according to the results of the determination.

BRIEF DESCRIPTION OF THE DRAWINGS

The above and other features and advantages of the present invention will become more apparent by describing in detail preferred embodiments thereof with reference to the attached drawings in which:

FIG. 10 illustrates diagrams for explaining how to display a route between at least two schedule places chosen from a schedule map;

FIG. 11 illustrates diagrams of various types of flags that can be displayed on a schedule map;

FIGS. 14 through 16 illustrate diagrams for explaining the adjustment of schedule or the execution of a schedule-related application in response to a command to select a flag when a schedule map is displayed on a touch screen;

FIG. 20 illustrates diagrams of screen images including a schedule map displayed as an idle screen or a popup window;

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop book computer, a digital broadcast receiver, a personal digital assistant (PDA), a portable multimedia player (PMP), or a navigation device.

Figure 1:
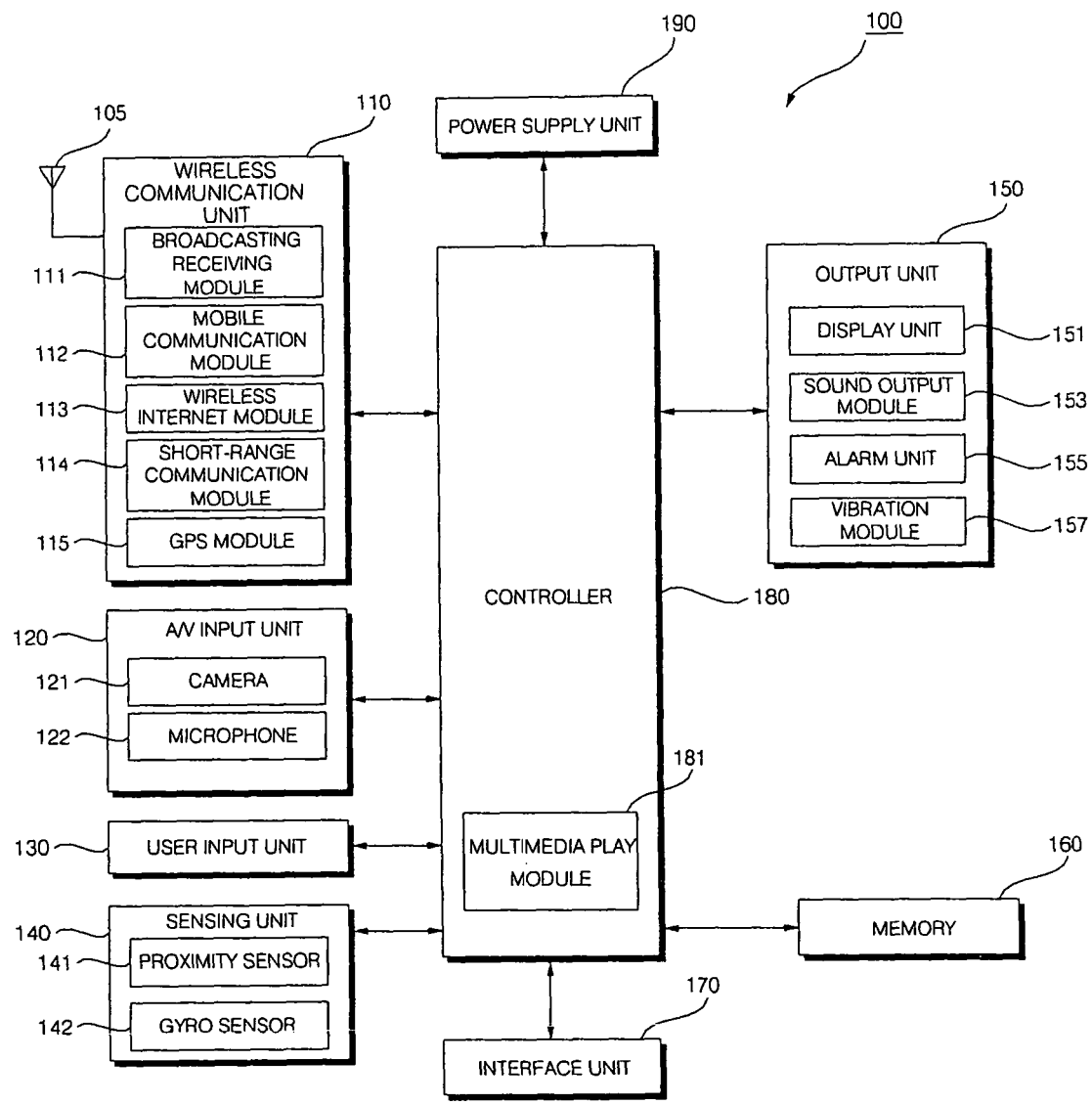
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a control unit 180, and a power supply unit 190. Two or more of the wireless communication unit 110, the A/V input unit 120, the user input unit 130, the sensing unit 140, the output unit 150, the memory 160, the interface unit 170, the control unit 180, and the power supply unit 190 may be incorporated into a single unit, or some of the wireless communication unit 110, the A/V input unit 120, the user input unit 130, the sensing unit 140, the output unit 150, the memory 160, the interface unit 170, the control unit 180, and the power supply unit 190 may be divided into two or more smaller units.

The wireless communication unit 110 may include a broadcast reception module 111, a mobile communication module 113, a wireless Internet module 115, a short-range communication module 117, and a global positioning system (GPS) module 119.

The broadcast reception module 111 receives a broadcast signal and/or broadcast-related information from an external broadcast management server through a broadcast channel. Examples of the broadcast channel include a satellite channel and a terrestrial channel. The broadcast management server may be a server which generates broadcast signals and/or broadcast-related information and transmits the generated broadcast signals and/or the generated broadcast-related information or a server which receives and then transmits previously-generated broadcast signals and/or previously-generated broadcast-related information.

Examples of the broadcast-related information include broadcast channel information, broadcast program information and broadcast service provider information. Examples of the broadcast signal include a TV broadcast signal, a radio broadcast signal, a data broadcast signal, or the combination of a data broadcast signal and either a TV broadcast signal or a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms, for example, electronic program guide (EPG) of digital multimedia broadcasting (DMB) or electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein.

The broadcast signal and/or the broadcast-related information received by the broadcast reception module 1110 may be stored in the memory 160.

The mobile communication module 113 transmits wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The mobile communication module 113 may be a module for wirelessly accessing the Internet. The mobile communication module 113 may be embedded in the mobile terminal 100 or may be installed in an external device. The short-range communication module 117 may be a module for short-range communication. The short-range communication module 117 may use various short-range communication techniques such as Bluetooth, radio frequency identification (RFID), infrared data association (IrDA), ultra wideband (UWB), and ZigBee.

The GPS module 119 may receive position information from a plurality of GPS satellites.

A/V input unit 120 may be used to receive audio signals or video signals. The A/V input unit 120 may include a camera module 121 and a microphone module 123. The camera module 121 processes various image frames such as still images or moving images captured by an image sensor during a video call mode or an image capturing mode. The image frames processed by the camera module 121 may be displayed by a display module 151.

The image frames processed by the camera module 121 may be stored in the memory 160 or may be transmitted outside the mobile terminal 100 through the wireless communication unit 110. The mobile terminal 100 may include two or more camera modules 121.

The microphone module 123 receives external sound signals during a call mode, a recording mode, or a voice recognition mode with the use of a microphone and converts the sound signals into electrical sound data. In the call mode, the mobile communication module 1130 may convert the electrical sound data into data that can be readily transmitted to a mobile communication base station and then output the data obtained by the conversion. The microphone module 123 may use various noise removal algorithms to remove noise that may be generated during the reception of external sound signals.

The user input unit 130 generates key input data based on user input for controlling the operation of the mobile terminal 100. The user input unit 130 may be implemented as a keypad, a dome switch, a touch pad (either static pressure or constant electricity), a jog wheel, or a jog switch. In particular, if the user input unit 130 is implemented as a touch pad and forms a mutual layer structure along with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a proximity sensor 141. The proximity sensor 141 may detect an object that is nearby and approaching and may determine whether there is an object nearby without any mechanical contact with an object. The proximity sensor 141 may detect an object that is nearby and approaching by detecting a variation in an alternating magnetic field or the rate of variation of static capacitance. The sensing unit 140 may include two or more proximity sensors 141.

The sensing unit 140 may also include a gyro sensor 142. The gyro sensor 142 is a sensor sensing the motion of an object by using a gyroscope. Examples of the gyro sensor 142 include an inertial sensor and an acceleration sensor. A gyroscope is classified into a mechanical gyroscope, a ring laser gyroscope, or an optic fiber gyroscope. The gyro sensor 142 may sense the motion of an object and may thus provide a signal for controlling the mobile terminal 100.

The output unit 150 may output audio signals, video signals and alarm signals. The output unit 150 may include the display module 151, a sound output module 153, an alarm module 153, and a vibration module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

As described above, if the display module 151 and the user input unit 130 form a mutual layer structure and are thus implemented as a touch screen, the display module 151 may be used not only as an output device but also as an input device. The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The sound output module 153 may output audio data received by the wireless communication unit 110 during a call reception mode, a call mode, a recording mode, a voice recognition mode, or a broadcast reception mode or may output audio data present in the memory 160. In addition, the sound output module 153 may output various sound signals associated with the functions of the mobile terminal 100 such as receiving a call or a message. The sound output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. The alarm module 155 may output a signal upon receiving a call signal or a message. In addition, the alarm module 155 may receive a key signal and may output a signal as feedback to the key signal. Once a signal is output by the alarm unit, a user may recognize that an event has occurred. A signal for notifying the user of the occurrence of an event may be output by the display module 151 or the sound output module 153.

The vibration module 157 may output various types of vibration signals at various intensities under the control of the control unit 180. The intensity, the type, the frequency, the direction and the speed of vibration signals generated by the vibration module 157 may be determined according to a signal provided by the control unit 180. The mobile terminal 100 may include two or more vibration modules 157.

The memory 160 may store various programs necessary for the operation of the control unit 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the Internet.

The interface unit 170 may interface with an external device that can be connected to the mobile terminal 100. The interface unit 170 may be a wired/wireless headset, an external battery charger, a wired/wireless data port, a card socket for, for example, a memory card) or a subscriber identification module (SIM)/user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

The control unit 180 may control the general operation of the mobile terminal 100. For example, the control unit 180 may perform various control operations regarding making/receiving a voice call, transmitting/receiving data, or making/receiving a video call. The control unit 180 may include a multimedia play module 181, which plays multimedia data. The multimedia play module 181 may be implemented as a hardware device and may be installed in the control unit 180. Alternatively, the multimedia play module 181 may be implemented as a software program.

The power supply unit 190 is supplied with power by an external power source or an internal power source and supplies power to other components in the mobile terminal 100.

The exterior of the mobile terminal 100 will hereinafter be described in detail with reference to FIGS. 2 and 3. For convenience, assume that the mobile terminal 100 is a slider-type mobile phone. However, the present invention is not restricted to a slider-type mobile phone. Rather, the present invention can be applied to various mobile phones, other than a slider-type mobile phone.

Figure 2:
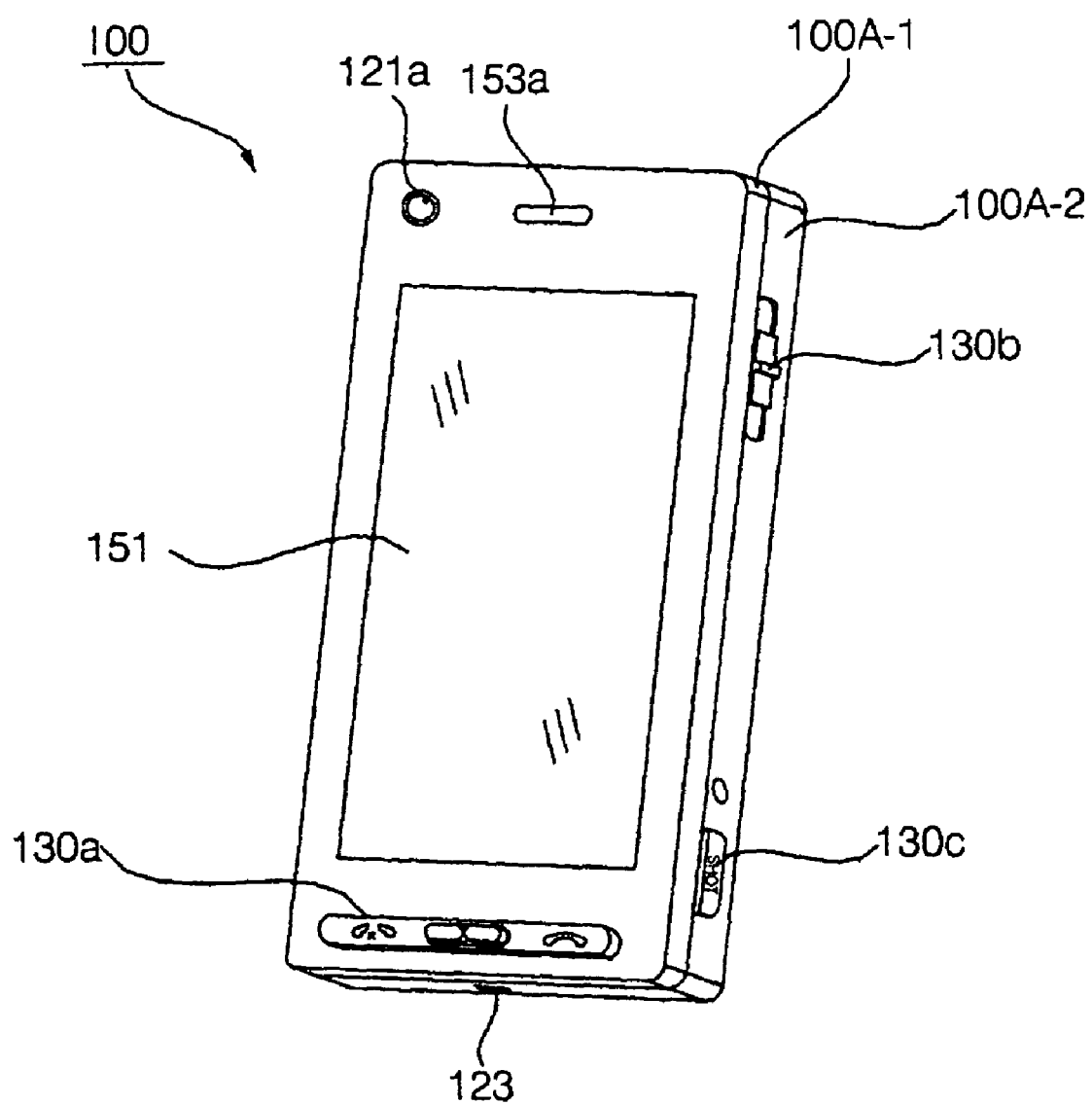
FIG. 2 illustrates a front perspective view of the mobile terminal illustrated in FIG. 1.

FIG. 2 illustrates a front perspective view of the mobile terminal 100 shown in FIG. 1. Referring to FIG. 2, the mobile terminal 100 may include a front case 100A-1 and a rear case 100A-2, which form the exterior of the first body 100A. Various electronic products may be installed in the space between the front case 100A-1 and the rear case 100A-2. At least one intermediate case may be additionally disposed between the front case 100A-1 and the rear case 100A-2.

The front case 100A-1 and the rear case 100A-2 may be formed of a synthetic resin through injection molding. Alternatively, the front case 100A-1 and the rear case 100A-2 may be formed of a metal such as stainless steel (STS) or titanium (Ti).

The display module 151, a first sound output module 153a, a first camera module 121a, and a first user input module 130a may be disposed in the first body, and particularly, in the front case 100A-1. A second user input module 130b, a third user input module 130, and a microphone module 123 may be disposed on a lateral side of the rear case 100A-2.

The display module 151 may include an LCD or an OLED, which visually represents information. Since a touch pad is configured to overlap the display module 151 and thus to realize a layer structure, the display module 151 may serve as a touch screen. Thus, it is possible for a user to input information to the display module 151 simply by touching the display module 151.

The first sound output module 153a may be implemented as a receiver or a speaker.

The first camera module 121a may be configured to capture a still image or a moving image of a user. The microphone module 123 may be configured to receive the voice of a user and other sounds.

The first through third user input modules 130a through 130c may be collectively referred to as the user input unit 130. The user input unit 130 may adopt various manipulation methods as long as they can offer tactile feedback to a user.

For example, the user input unit 130 may be implemented as a dome switch or a touch pad which receives a command or information upon being pushed or touched by a user. Alternatively, the user input unit 130 may be implemented as a wheel, a jog dial, or a joystick. The first user input module 130a may allow a user to input such commands as 'start', 'end', and 'scroll'. The second manipulation module 130-2 may allow a user to input numbers, characters or symbols. The third manipulation module 130-3 may serve as a hot key for activating certain functions of the mobile terminal 100.

If an object, for example, the user's finger, is approaching and nearby the display unit 151, the proximity sensor 141 may sense the user's finger and may output a proximity signal. The proximity sensor 141 may output different proximity signals according to the distance between the display unit 141 and the user's finger. More specifically, the mobile terminal 100 may include a plurality of proximity sensors having different sensing ranges. In this case, it is possible to determine how close the user's finger is to the display unit 151 by comparing a plurality of proximity signals respectively provided by the proximity sensors. In addition, it is possible to determine what part of the display unit 151 is being approached by the user's finger and whether the user's finger is moving within a close range of the display unit 151 by determining which of the proximity sensors 141 outputs a proximity signal. Therefore, the control unit 180 may control a touch key corresponding to a position on the display unit 151 approached by the user's finger to be chosen and may thus control a vibration signal corresponding to the chosen touch key.

If the user tilts or shakes the mobile terminal 100, the gyro sensor 142 may sense that the mobile terminal 100 has been moved. Thereafter, the gyro sensor 142 may generate a signal corresponding to the movement of the mobile terminal 100 and may output the signal to the control unit 180. Then, the control unit 180 may obtain various information regarding the movement of the mobile terminal 100 such as the direction, angle, velocity, and magnitude of the movement of the mobile terminal 100 and a current location of the mobile terminal 100 from the signal generated by the gyro sensor 142.

The control unit 180 may keep track of the movement of the mobile terminal 100 with the information obtained from the signal generated by the gyro sensor 142. The type of information that can be obtained from the gyro sensor 142 may vary according to the type of the gyro sensor 142. Thus, the type of gyro sensor 142 that can be used in the mobile terminal 100 may be determined by the type of motion information desired to be detected from the mobile terminal 100. The mobile terminal 100 may include at least one gyro sensor 142. The control unit 180 may control the gyro sensor 142 to be driven only when a certain application is executed.

Figure 3:
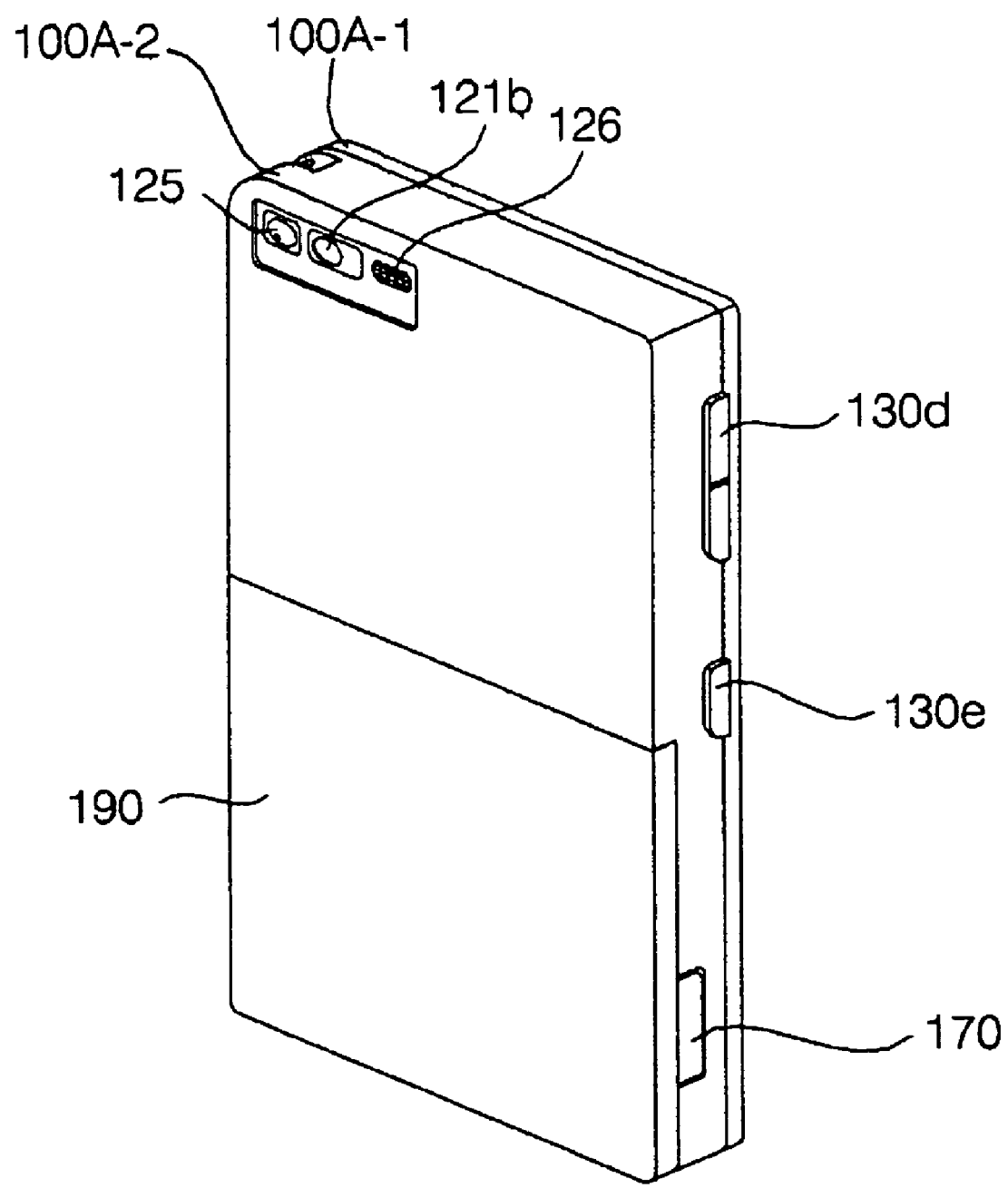
FIG. 3 illustrates a rear perspective view of the mobile terminal illustrated in FIG. 2.

FIG. 3 illustrates a rear perspective view of the mobile terminal 100 shown in FIG. 2. Referring to FIG. 3, a fourth user input unit 130d, a fifth user input unit 130d, and the interface unit 170 may be disposed on a lateral side of the rear case 100A-2. A second camera module 121b may be disposed at the rear of the rear case 100A-2.

The second camera module 121b may have a different photographing direction from that of the first camera module 121a shown in FIG. 2. In addition, the number of pixels of the second camera module 121b may be different from the number of pixels of the first camera module 121a. For example, the first camera module 121a may be used to capture an image of the face of a user and then readily transmit the captured image during a video call. Thus, a low-pixel camera module may be used as the first camera module 121a. The second camera module 121b may be used to capture an image of an ordinary subject. Given that images captured by the second camera module 121b generally do not need to be transmitted, a high-pixel camera module may be used as the second camera module 121b.

A mirror 125 and a camera flash 126 may be disposed near the second camera module 121b. A user may look in the mirror 125 when capturing an image of himself/herself with the second camera module 121b. The camera flash 126 illuminates a subject when the second camera module 121b captures an image of the subject.

A second sound output module (not shown) may be additionally provided in the rear case 100A-2. The second sound output module may realize a stereo function together with the first sound output module 153a shown in FIG. 2. The second sound output module may be used in a speaker phone mode.

An antenna (not shown) for receiving a broadcast signal may be provided on one side of the rear case 100A-2. The antenna 111-1 may be ejected from the rear case 100A-2.

The interface unit 170 may serve as a path for allowing the mobile terminal 100 to exchange data with an external device. For example, the interface unit 170 may be a connection terminal for connecting an earphone to the mobile terminal 100 in a wired or wireless manner, a port for short-range communication or a power supply terminal for supplying power to the mobile terminal 100. The interface unit 170 may be a user authentication module such as a SIM or a UIM or may be a card socket for an exterior-type card such as a memory card for storing data.

The power supply unit 190 may be inserted in the rear case 100A-2. The power supply unit 190 may be a rechargeable battery and may be coupled to the rear case 100A-2 so as to be able to be attached to or detached from the rear case 100A-2.

The second camera module 121b is illustrated in FIG. 3 as being disposed on the second body 100B, but the present invention is not restricted to this. In addition, the first camera module 121a may be able to rotate and thus to cover the photographing direction of the second camera module 121a. In this case, the second camera module 121b may be optional.

FIGS. 4 through 7 illustrate flowcharts of methods of controlling a mobile terminal according to exemplary embodiments of the present invention. The following methods are described relative to the device shown in FIGS. 2-3. However, one skilled in the art would know that the methods described below may operate with a differently configured device, such as a device configured as a flip-phone, a phone that rotates around a swivel point, or another phone configuration.

Figure 4:
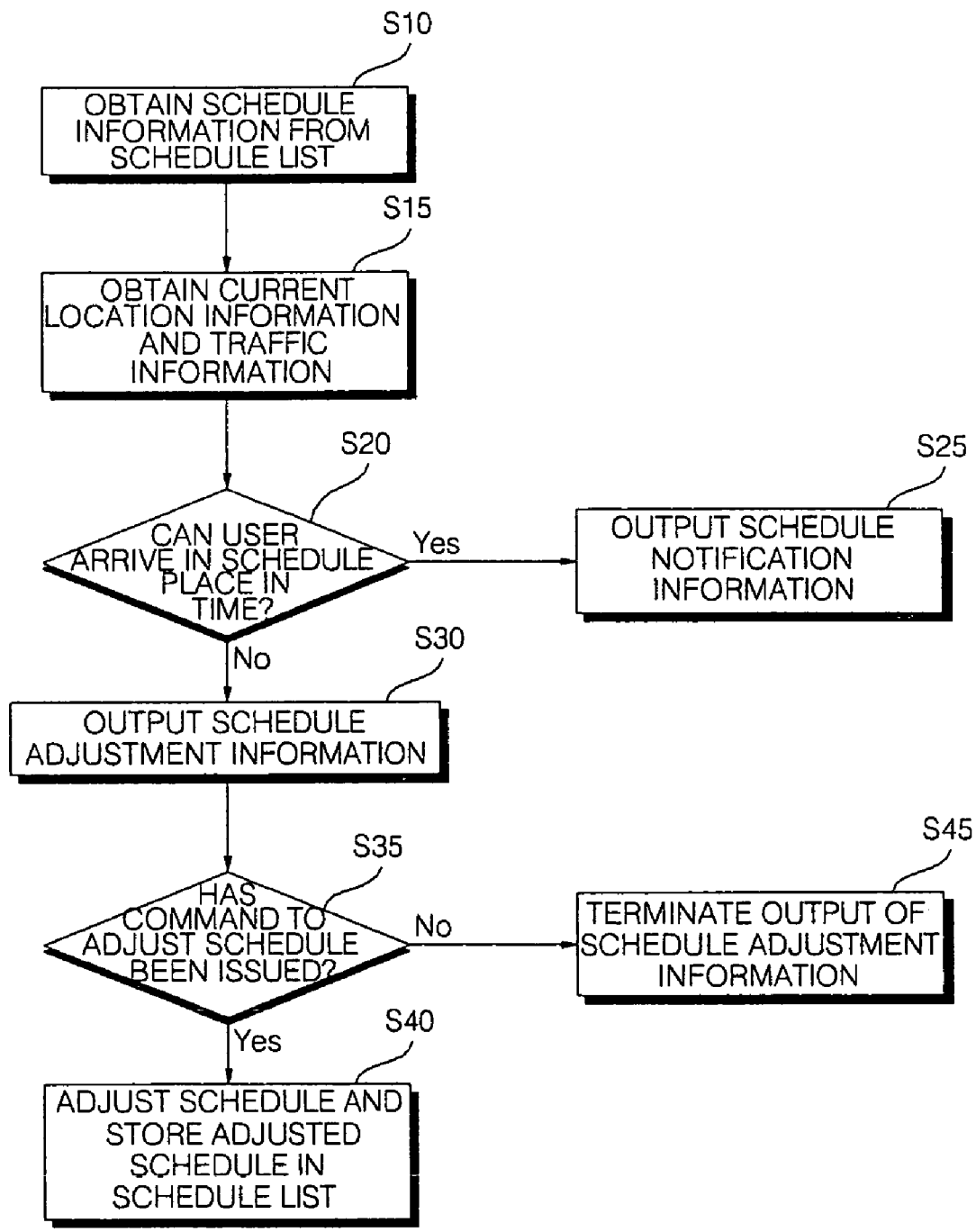
FIG. 4 illustrates a flowchart of a schedule management method of a mobile terminal according to an exemplary embodiment of the present invention.

More specifically, FIG. 4 illustrates a flowchart of a schedule management method of the mobile terminal 100, according to an exemplary embodiment of the present invention. Referring to FIG. 4, the control unit 180 may obtain schedule place and time information corresponding to a predetermined schedule item of a schedule list (S10). A user may store a number of things to do in association with a scheduled event corresponding to the predetermined schedule item in the schedule list. The schedule list may include a number of schedule items respectively corresponding to a number of scheduled events. Each of the schedule items may include a schedule place and schedule information corresponding to the schedule place such as schedule time information. Examples of the schedule information include the importance of a scheduled event, the type of the scheduled event (e.g., whether the scheduled event is personal or business-related), and information regarding the parties of the scheduled event (e.g., whether the parties of the scheduled event are coworkers, business acquaintances, or friends). The schedule location information may include a location of the scheduled event. The schedule time information may include the time and/or duration of the scheduled information, as well as any advance notice or alarm settings.

The control unit 180 may obtain current location information of the mobile terminal 100 and traffic information (S15). The control unit 180 may obtain the current location information with the aid of the GPS module 115. Alternatively, the control unit 180 may obtain the current location information by transmitting/receiving signals to/from a wireless base station. The control unit 180 may be provided with traffic information in real time or at regular intervals of time through wired/wireless communication. For example, the control unit 180 may download traffic information from a wireless Internet. The traffic information obtained in operation S115 may be traffic information of a region in which the mobile terminal 100 is located or traffic information of a region including the place of the predetermined scheduled event. Examples of the traffic information obtained in operation S15 include traffic condition information indicating whether traffic is congested and whether traffic accidents have occurred and transportation information indicating means of transportation available (e.g., aircraft, ferries, ships, buses, subway, trains and automobiles).

The control unit 180 may receive traffic information from an external source and may generate detailed traffic information regarding the place of the predetermined scheduled event based on the received traffic information. For example, the control unit 180 may calculate an estimated amount of time to get to the place of the predetermined scheduled event based on the received traffic information. The traffic information obtained in operation S15 may include not only traffic information received by the control unit 180 but also traffic information generated by the control unit 180.

The control unit 180 may determine whether the user can arrive at the place of the predetermined scheduled event in time based on the traffic information obtained in operation S15 (S20). If the place of the predetermined scheduled event is 'Yeoksam-dong, Kangnam-gu, Seoul, Korea', the control unit 180 may estimate the time it will take to get to 'Yeoksam-dong' based on the current location information and traffic information regarding 'Yeoksam-dong' and may then determine whether the user can arrive at 'Yeoksam-dong' in time for the predetermined scheduled event based on the results of the estimation. The estimation may take into consideration the availability of alternate routes, including a shortest route, a statistically fastest route, etc, in order to identify an optimum route given the instant circumstances.

If the control unit 180 determines that the user can arrive at 'Yeoksam-dong' in time for the predetermined scheduled event, the control unit 180 may output schedule notification information (S25). The schedule notification information may include a schedule place corresponding to the predetermined scheduled event and at least one of the following: schedule time information corresponding to the schedule place, the importance of the predetermined scheduled event, the type of the predetermined scheduled event, information regarding the participant(s) of the predetermined scheduled event, information indicating whether the predetermined scheduled event has been rescheduled, information indicating whether the predetermined scheduled event has already been attended by the user, current location information, traffic information and an optimal route to the place of the predetermined scheduled event. The schedule notification information may be displayed in a display region as a map or text. The schedule notification information may be output as sound by the sound output module 153.

If the control unit 180 determines that the user cannot arrive at 'Yeoksam-dong' in time for the predetermined scheduled event, the control unit 180 may output schedule adjustment information. The schedule adjustment information may provide at least one of a plurality of scenarios for postponing the predetermined scheduled event, changing the time of the predetermined scheduled event, changing the place of the predetermined scheduled event, and canceling the predetermined scheduled event, and information indicating means of transportation available of recommended.

The schedule adjustment information may be displayed in the display region using a map or text. For example, the control unit 180 may display a popup window for postponing a scheduled event (e.g., an event with a low priority level or having a specific event type or having another characteristic), changing the time or the place of the scheduled event or canceling the scheduled event. Alternatively, if schedule adjustment is performed when a schedule map showing a number of schedule places and/or a route between the schedule places is displayed in the display region, the control unit 180 may display an updated schedule map including the results of the schedule adjustment in the display region. In this disclosure, the expression 'route between two or more schedule places' indicates a route connecting the schedule places in order of schedule time.

The user may choose one of the scenarios of the schedule adjustment information.

The control unit 180 may determine whether a command to adjust schedule has been issued by the user (S35). If one of the scenarios of the schedule adjustment information is chosen by the user, the control unit 180 may determine that a command to adjust schedule has been issued by the user.

Thereafter, the control unit 180 may perform a schedule adjustment on the predetermined scheduled event and may store the results of the schedule adjustment in the schedule list (S40). If a schedule map showing a number of schedule places or a route between the schedule places is displayed in the display region, the control unit 180 may update the schedule map according to the results of the schedule adjustment performed in operation S40.

If the control unit 180 determines that a command to adjust schedule is yet to be issued by the user, the control unit 180 may stop displaying the schedule adjustment information (S45). For example, if the schedule adjustment information is displayed as a popup window, the control unit 180 may close the popup window.

Figure 5:
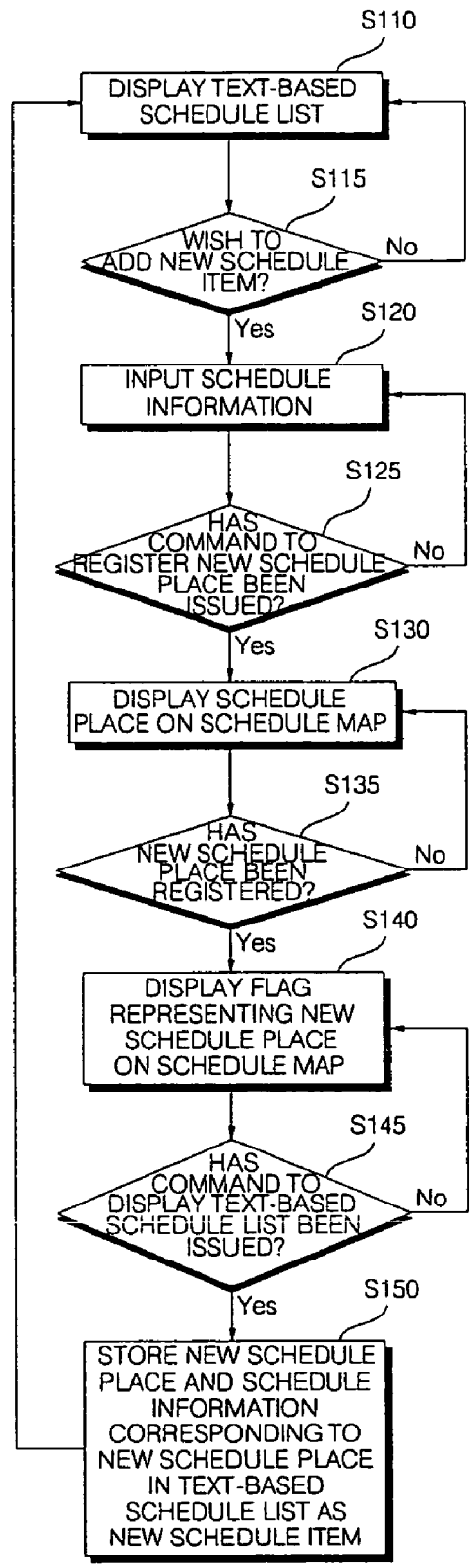
FIG. 5 illustrates a flowchart of a schedule management method of a mobile terminal according to another exemplary embodiment of the present invention.

FIG. 5 illustrates a flowchart of a schedule management method of the mobile terminal 100, according to another exemplary embodiment of the present invention. Referring to FIG. 5, the control unit 180 displays a text-based schedule list (S110). The text-based schedule list may include a number of schedule items respectively corresponding to a number of scheduled events. Each of the schedule items has place and time information of a corresponding scheduled event and a number of things to do in association with the corresponding scheduled event.

A user may add a new schedule item to the text-based schedule list. The control unit 180 determines whether a command to add a new schedule list has been issued by the user (S115). For example, if the user touches a schedule add icon displayed in a display region, the control unit 180 may determine that a command to add a new schedule list has been issued by the user.

The user may input schedule information such as the time, the importance and the type of a scheduled event to be added to a schedule information input window (S120). The schedule information input to the schedule information input window may be text-based schedule information.

A new schedule item may also be added to the text-based schedule list by way of an incoming email or text message or other message. Entry of an externally generated new schedule item may be automatically added to the text-based schedule list based on predetermined criteria (e.g., event source, event type, event importance, event time, or other criteria), or may be added only upon user approval or confirmation provided via a pop-up window.

The control unit 180 may determine whether a command to register a new schedule place has been issued by the user (S125). For example, if the user touches a map icon displayed in the display region, the control unit 180 may determine that a command to register a new schedule place has been issued by the user.

If the control unit 180 determines that a command to register a new schedule place has been issued by the user, the control unit 180 may display a schedule map in the display region (S130). The user may register a new schedule place in the schedule map (S135). For example, if a point on the schedule map is touched by the user when the display region is displayed on a touch screen, a place corresponding to the touched point on the schedule map may be registered in the schedule map as a new schedule place.

If the user inputs a name of a region including a desired schedule place, the control unit 180 may display a schedule map corresponding to the region in the display region. If the user inputs 'Yeoksam-dong, Kangnam-gu, Seoul' and then touches the map icon, the control unit 180 may display a schedule map corresponding to the Yeoksam area in the display region. If the user inputs 'Seocho-dong, Kangnam-gu' and then touches the map icon, the control unit 180 may display a schedule map corresponding to the Seocho area in the display region. In this manner, the user may easily identify the desired schedule place from a schedule map or change a schedule place for a certain schedule event.

The control unit 180 may display a flag representing the new schedule place registered in operation S135 on the schedule map (S140). The flag may be an object or an icon displayed on the schedule map and represents the new schedule place. The shape of the flag may be altered in various manners.

In one exemplary embodiment, if the user calls a schedule map and registers a new schedule place in the schedule map, the control unit 180 may display a flag representing the new schedule place on the schedule map. If the user inputs the name of a desired schedule place and then touches a map icon, the control unit 180 may display a schedule map corresponding to the desired schedule place in the display region. In this manner, the user may easily identify the desired schedule place from the schedule map or change a schedule place for a certain schedule event.

Thereafter, the control unit 180 determines whether a command to complete the registration of a new schedule place has been issued by the user. In this exemplary embodiment, the user manages schedule using a text-based schedule list. Therefore, if a command to display a text-based schedule list is received, the control unit 180 may determine that a command to complete the registration of a schedule place has been issued by the user (S145).

Then, the control unit 180 stores the schedule information input by the user and the schedule place registered by the user in the text-based schedule list as a new schedule item (S150).

Figure 6:
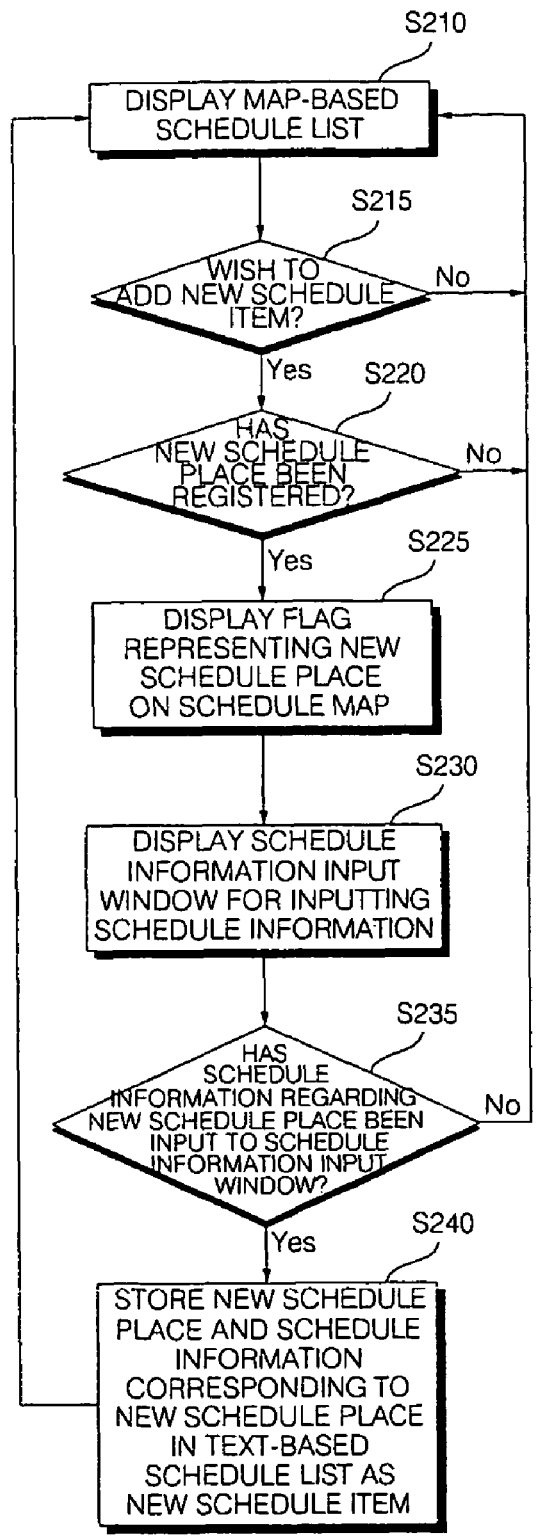
FIG. 6 illustrates a flowchart of a schedule management method of a mobile terminal according to another exemplary embodiment of the present invention.

FIG. 6 illustrates a flowchart of a schedule management method of the mobile terminal 100, according to another exemplary embodiment of the present invention. Referring to FIG. 6, the control unit 180 may display a map-based schedule list in a display region (S210). The map-based schedule list may be a schedule map showing a number of schedule places. If one of the schedule places is chosen from the schedule map, schedule information corresponding to the chosen schedule place may be displayed.

A user may add a new schedule item to the map-based schedule list. The control unit 180 determines whether a command to add a new schedule item has been issued by the user (S215). For example, if a display region is displayed on a touch screen and a schedule add icon displayed in the display region is touched by the user, the control unit 180 may determine that a command to add a new schedule item has been issued by the user.

The control unit 180 may determine whether a new schedule place has been registered in the map-based schedule list by the user (S220). For example, if the display region is displayed on a touch screen and the user touches a point on the schedule map, the control unit 180 may determine that a place corresponding to the touched point on the map-based schedule list has been registered by the user.

The control unit 180 may display a flag representing the new schedule place registered by the user on the map-based schedule list (S225).

The control unit 180 may display a schedule information input window for allowing the user to input schedule information regarding the new schedule place in the display region (S230).

Then, the user may input schedule information regarding the new schedule place using the schedule information input window. Thereafter, the control unit 180 may determine whether schedule information regarding the new schedule place has been input by the user (S235). If the control unit 180 determines that schedule information regarding the new schedule place has been input by the user (S235), the control unit 180 stores the new scheduled place and the schedule information regarding the registered schedule place in the map-based schedule list as a new schedule item (S240). The control unit 180 may display the new schedule place or a route to the new schedule place on the map-based schedule list.

Figure 7:
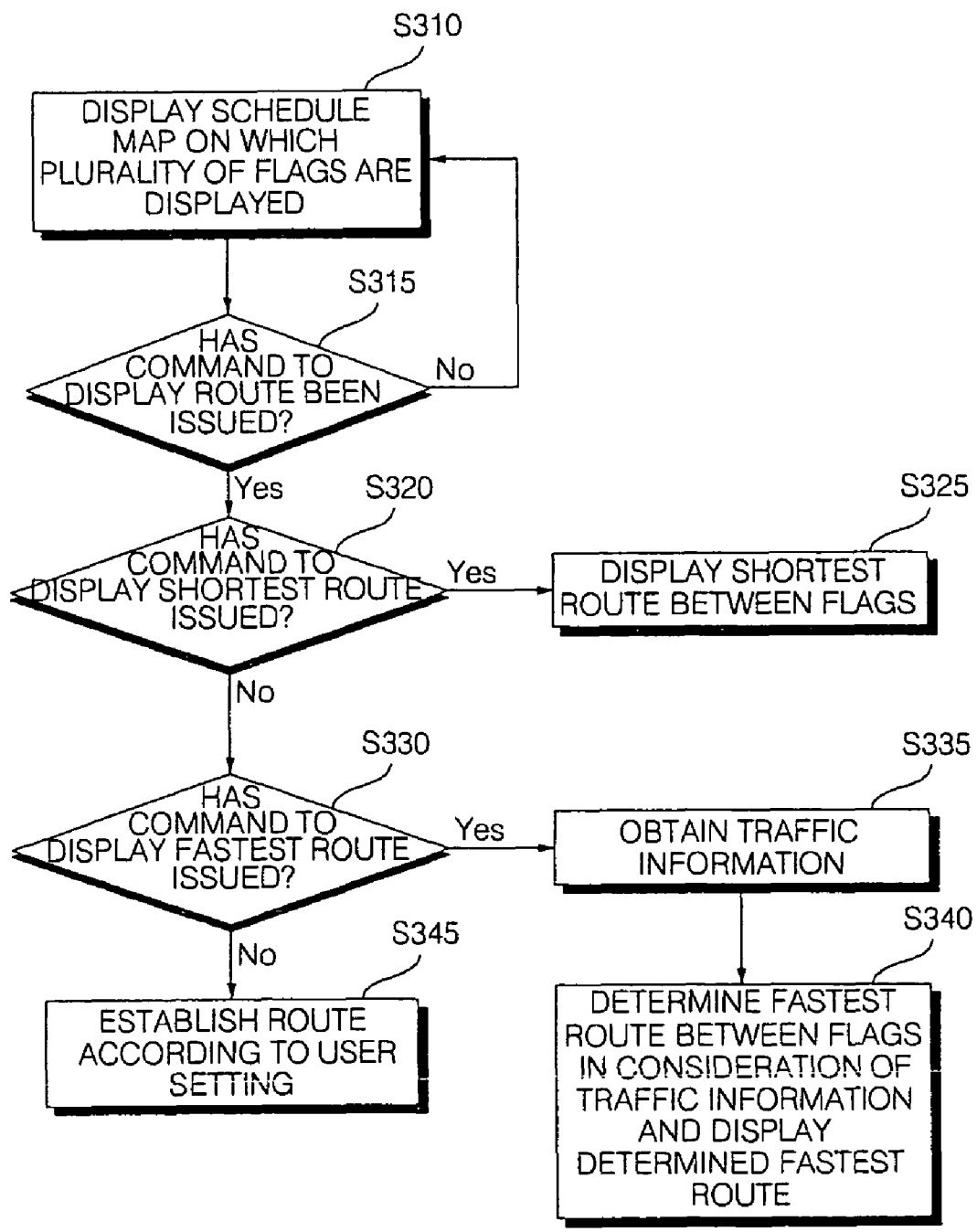
FIG. 7 illustrates a flowchart of a method of displaying a route on a schedule map, on which a number of schedule places are displayed, according to an exemplary embodiment of the present invention.

FIG. 7 illustrates a flowchart of a method of displaying a route on a schedule map, on which a number of schedule places are marked, according to an exemplary embodiment of the present invention. If two or more schedule places are chosen from a schedule map, a route between the chosen schedule places may be automatically displayed either upon receiving the names of the chosen schedule places and time information of the chosen schedule places or upon receiving a command to display a route from a user.

The route between the chosen schedule places may be a shortest route, a fastest route determined in consideration of traffic information or a route established to pass through certain places chosen by the user. The control unit 180 may be set to automatically display a fastest route or a shortest route between the chosen schedule places upon receiving a command to display a route. Alternatively, the control unit may allow the user to choose the type of route to be displayed upon receiving a command to display a route. A route displaying method capable of allowing the user to choose the type of route to be displayed will hereinafter be described in detail with reference to FIG. 7.

Referring to FIG. 7, the control unit 180 may display a schedule map, on which a number of flags respectively representing a number of schedule places are displayed, in a display region (S310). The control unit 180 determines whether a command to display a route has been issued by a user (S310). If the mobile terminal 100 is set to automatically display a route, the control unit 180 may display the schedule map in the display region and may display a route between the flags on the schedule map.

The control unit 180 may determine whether a command to display a shortest route has been issued by the user (S320). If the control unit 180 determines that a command to display a shortest route has been issued by the user, the control unit 180 may display a shortest route between the flags (S325).

The control unit 180 may determine whether a command to display a fastest route has been issued by the user (S330). If the control unit 180 determines that a command to display a fastest route has been issued by the user, the control unit 180 may obtain traffic information (S335).

Thereafter, the control unit 180 may determine a fastest route between the flags in consideration of the traffic information and may display the determined fastest route (S340). For example, if the traffic information indicates that traffic is congested in a certain area on the shortest route between the flags, the control unit 180 may establish a fastest route between the flags to bypass the certain area. If the shortest route between the flags includes a number of subway stations and the traffic information indicates that a fire has occurred in one of the subway stations, the control unit 180 may establish a fastest route not to include the subway stations. Here, the reference to fires in subway stations is only an example. Other transport features that may be avoided, either through user selection of via an algorithm include a ferry, a toll road, a draw bridge or another route item that may contribute to movement delays.

The control unit 180 may display a route established by the user (S345). For example, the user may wish to pick someone up or drop someone off at a certain place in the middle of driving from one schedule place to another. In this case, the control unit 180 may allow the user to establish a route and may display the route established by the user.

Figure 8:
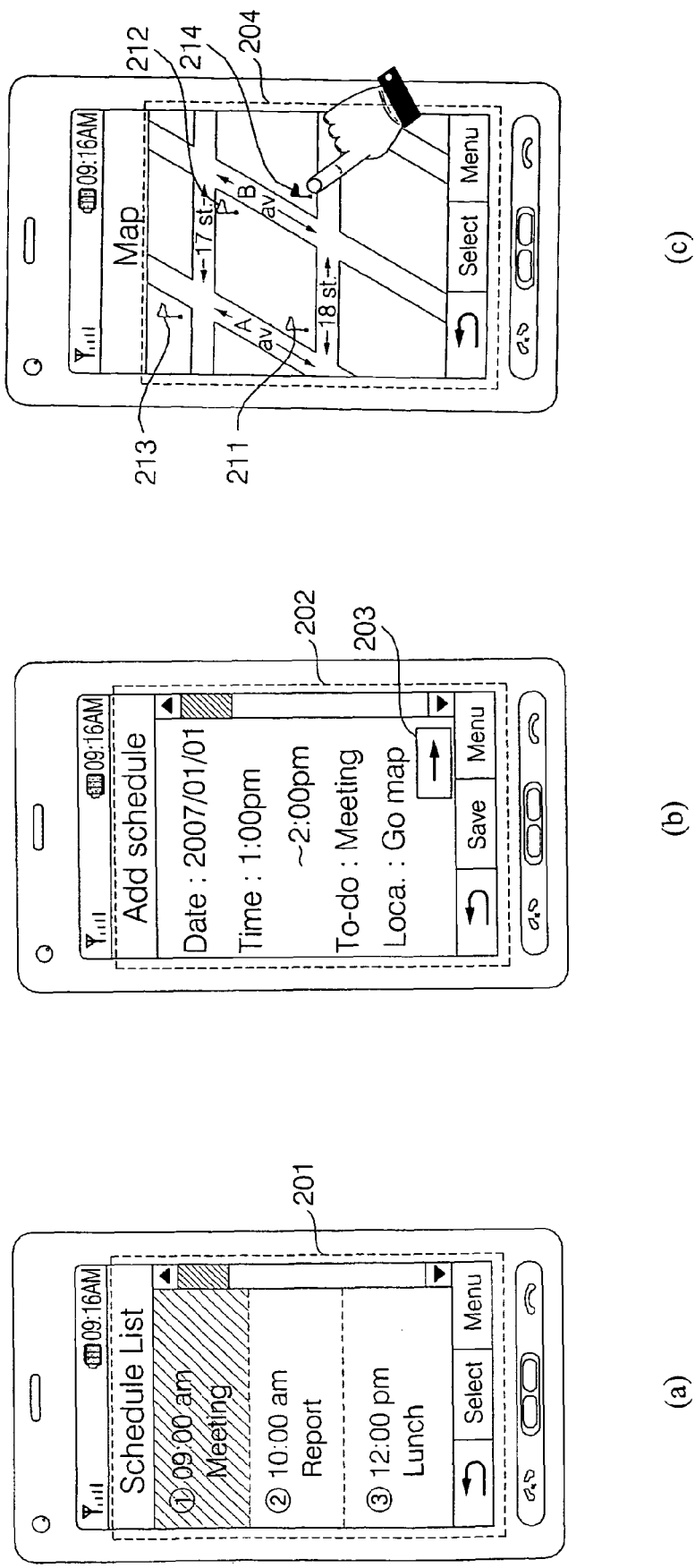
FIG. 8 illustrates diagrams for explaining how to add a new schedule to a text-based schedule list.

FIG. 8 illustrates diagrams for explaining how to add a new schedule item to a text-based schedule list using a schedule map. Referring to FIG. 8(a), the control unit 180 may display a text-based schedule list screen 201 in a display region. A text-based schedule list may include a plurality of schedule items respectively corresponding to a plurality of scheduled events. Each of the schedule items includes schedule place information, schedule time information and a number of things to do in association with a corresponding scheduled event. A user may identify each of the schedule items of the text-based schedule list.

If the user chooses a schedule add icon, the control unit 180 may display a schedule information input window 202 in the display region, as illustrated in FIG. 8(b). Then, the user may register schedule information regarding a new scheduled event desired to be added such as schedule date and time information of the new scheduled event, a number of things to do in association with the new scheduled event and schedule time information of the new scheduled event using the schedule information input window 202.

In addition, the user may also look up the phone numbers of the parties of the new scheduled event and may register the looked-up phone numbers as schedule information regarding the new scheduled event. For example, if the new scheduled event is a business meeting, the user may look up the phone numbers of coworkers and may store the looked-up phone numbers as schedule information regarding the business meeting. Therefore, if the new scheduled event is cancelled or the time or the place of the new scheduled event has changed, the control unit 180 may automatically notify the parties of the new scheduled event by sending a message or email or allowing the user to make a call to the parties of the new scheduled event.

The user may register the place of the new scheduled event as a new schedule place and may display the new schedule place on a schedule map. More specifically, if the user chooses a map icon 203 displayed in the schedule information input window 202, the control unit 180 may display a schedule map 204 in a display region, as illustrated in FIG. 8(c).

If the display region is displayed on a touch screen, the user may choose a desired schedule place using the schedule map 204 by touching a point on the schedule map 204. Then, the control unit 180 may display a flag at the touched point on the schedule map 204. Referring to FIG. 8(c), a plurality of first through fourth flags 211 through 214 may respectively correspond to a plurality of schedule places. Thus, the user may easily identify the schedule places from the schedule map 204 due to the flags 211 through 214.

In order to facilitate the registration of a schedule place by the user, the control unit 180 may display a thought balloon window or another data entry item if the user touches a point on the schedule map 204 for a short time or places his/her finger near a point on the schedule map 204. For example, if the proximity sensor 141 senses that there is an object (e.g., the user's finger) approaching and nearby, the control unit 180 may display the name and the address of a region corresponding to a point on the schedule map 204 approached by the object and the names of buildings or firms in the region using a thought balloon window. Thus, the user may easily identify the region corresponding to the point on the schedule map 204 approached by the object. The user may identify the place of the new scheduled event from the schedule map 204 and may register the place of the new scheduled event as a new schedule place by touching the thought balloon for a long time. Thereafter, the control unit 180 may display a flag at the registered new schedule place.

The first flag 211 may correspond to a first schedule item '9:00 AM, Meeting' of the text-based schedule list shown in FIG. 8(*a*), the second flag 212 may correspond to a second schedule item '10:00 AM, Report' of the text-based schedule list shown in FIG. 8(*a*), the third flag 213 may correspond to a third schedule item '12:00 PM, Lunch', and the fourth flag 214 may correspond to a new schedule item '1:00 PM, Meeting' added to the text-based schedule list shown in FIG. 8(*a*).

In this exemplary embodiment, if the user issues a flag selection command by placing his/her finger near or touching any one of the first through fourth flags 211 through 214 on the schedule map 204, the control unit 180 may display schedule information regarding whichever of the first through fourth flags 211 through 214 is approached or touched by the user's finger by using a popup window. Therefore, the user may easily obtain schedule information regarding each of the schedule items of the text-based schedule list shown in FIG. 8(*a*) from the schedule map 204.

Figure 9:
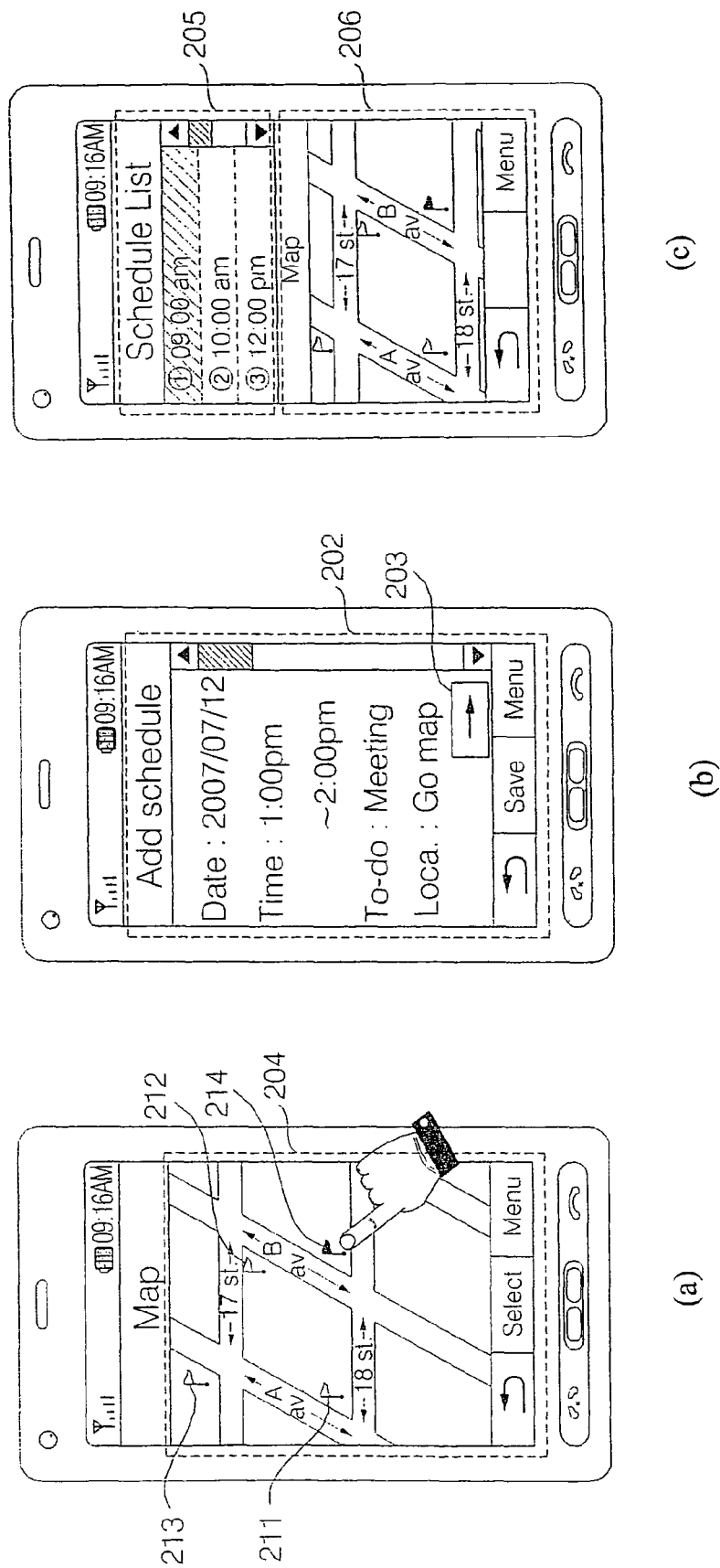
FIG. 9 illustrates diagrams for explaining how to add a new schedule to a map-based schedule list.

FIG. 9 illustrates diagrams for explaining how to add a new schedule item to a map-based schedule list. Referring to FIG. 9(*a*), the control unit 180 may display a schedule map 204 in a display region. If the schedule map 204 is displayed on a touch screen, a user may touch a point on the schedule map 204. Then, the control unit 180 may recognize the touched point on the schedule map 204 as a new schedule place to be registered, and may display a flag 214 at the touched point on the schedule map 204.

Referring to FIG. 9(*b*), the control unit 180 may display a schedule information input window 202 for allowing the user to input schedule information regarding the new schedule place. The user may call a schedule map by touching a map icon 203 displayed in the schedule information input window 202. Thereafter, the user may change the place of a scheduled event using the schedule map.

If the user issues a store command after inputting the schedule information regarding the new schedule place to the schedule information input window 202, the control unit 180 may store the new schedule place and the schedule information regarding the new schedule place in a text-based schedule list as a new schedule item.

Thereafter, referring to FIG. 9(*c*), the control unit 180 may display a text-based schedule list screen 205 and a schedule map 206 in the display region. The user may obtain schedule information of each schedule item of the text-based schedule list from the text-based schedule list screen 205 and may identify a schedule place corresponding to each schedule item of the text-based schedule list from the schedule map 206.

In this exemplary embodiment, if a point on a schedule map displayed in the display region is touched twice within a predefined amount of time, the control unit 180 may recognize the touched point on the schedule map as a new schedule place to be registered.

If a point on a schedule map displayed in the display region is touched, the control unit 180 may determine how the point on the schedule map is touched and may perform an operation according to the results of the determination. For example, if a flag displayed on the schedule map is touched for a short time, the control unit 180 may display a schedule place or schedule information corresponding to the touched flag using a thought balloon window. On the other hand, if a flag displayed on the schedule map is touched for a long time, the control unit 180 may display a schedule information input window for allowing the user to change schedule information corresponding to the touched flag. If a route displayed on the schedule map is touched, the control unit 180 may display traffic information regarding the touched route such as information indicating an estimated amount of time to get to a schedule place through the touched route, information indicating whether traffic is congested in areas near the touched route, or information indicating means of transportation available for the touched route. If two arbitrary flags displayed on the schedule map are touched, the control unit 180 may establish a route between the touched flags or may display information indicating an estimated amount of time to move from one of the flags to the other flag.

The operation of the mobile terminal 100 in accordance with the type of touch input will hereinafter be described in further detail. However, the present invention is not restricted to the exemplary embodiments set forth herein.

FIG. 10 illustrates diagrams for explaining how to display a route between two or more schedule places chosen from a schedule map. Referring to FIG. 10, if two or more schedule places are chosen and schedule time information for each of the schedule places is given, the control unit 180 may automatically display a route between the chosen schedule places in a display region. Alternatively, the control unit 180 may display a route between the chosen schedule places in the display region upon receiving a command to display a route from a user.

The route displayed by the control unit 180 may connect a number of flags respectively corresponding to a number of schedule places in order of schedule time. For example, the control unit 180 may display a shortest route 215 between a plurality of flags, as illustrated in FIG. 10(*a*). Alternatively, the control unit 180 may display a fastest route 216 between the flags, as illustrated in FIG. 10(*b*). The fastest route 216 may be determined in consideration of traffic information. Still alternatively, the control unit 180 may display a route established to pass through a number of places chosen by the user.

The fastest route 216 may be updated in real time or at regular intervals of time according to current location information of the mobile terminal 100 or traffic information received from an external source. If the fastest route 216 is updated according to traffic information received from an external source, the control unit 180 may display the updated fastest route.

Figure 12:
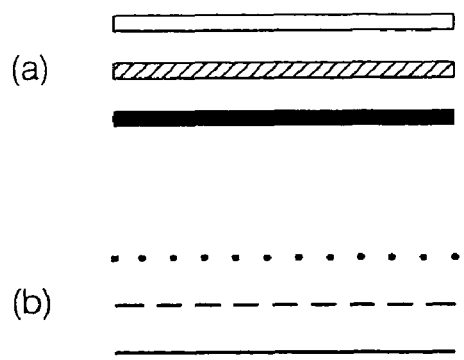
FIG. 12 illustrates diagrams of types of routes that can be displayed on a schedule map.

FIG. 11 illustrates diagrams of various types of flags that can be displayed on a schedule map, and FIG. 12 illustrates diagrams of various types of routes that can be displayed on a schedule map. Other icons may be displayed as well. Icon shape, size and color may be operator selectable or may be preset. Icons may flash, blink, rotate or otherwise be animated.

The control unit 180 may represent schedule information corresponding to a flag such as schedule time information, the importance and the type of a scheduled event corresponding to the flag, the parties of the scheduled event, information indicating whether the scheduled event has been rescheduled, and/or information indicating whether the scheduled event has already been attended by a user by altering at least one of the clarity, the color, and the shape of the flag.

In addition, the control unit 180 may represent schedule time information of a destination schedule place, traffic information regarding a route to the destination schedule place, and/or current location information by altering at least one of the clarity, the color and the shape of the route to the destination schedule place.

Therefore, a user may learn schedule information, current location information and traffic information from the clarity, the color and/or the shape of flags and the clarity, the color and/or the shape of routes.

Referring to FIG. 11(a), the control unit 180 may change the size of a flag in consideration of the difference between a current time and a schedule time. For example, the control unit 180 may display a largest flag for a scheduled event scheduled at a time closest to a current time.

Referring to FIG. 11(b), the control unit 180 may change the color of a flag in consideration of the importance of a scheduled event. For example, the control unit 180 may render a flag corresponding to a scheduled event with a high priority level in a darker shade than a flag corresponding to a scheduled event with low importance.

Referring to FIG. 11(c), the control unit 180 may change the clarity of a flag in consideration of whether a scheduled event has been rescheduled or whether the scheduled event has already been attended by a user. For example, the control unit 180 may display a flag with low clarity for a scheduled event that has been attended or deleted by the user.

Referring to FIG. 12(a), the control unit 180 may change the color of a route in consideration of traffic conditions and whether a user can arrive at a schedule place in time. For example, the control unit 180 may render part of a route corresponding to a congested area in a dark shade. Alternatively, the control unit 180 may render a route to a destination schedule place in a dark shade if the user cannot arrive at the destination schedule place in time. The routes may also be animated, so that a congested area blinks or does not blink, accordingly.

Referring to FIG. 12(b), the control unit 180 may change the shape of a route in consideration of current location information or information indicating means of transportation available or recommended. For example, the control unit 180 may render a route already traveled by a user as a dotted line. Alternatively, if the means of transportation available or recommended are subway, the control unit 108 may render a route as a dotted line. If the means of transportation available or recommended are buses, the control unit 108 may render a route as a broken line. If the means of transportation available or recommended are automobiles, the control unit 108 may render a route as a solid line. Broken lines or other lines may be used to distinguish toll roads, high occupancy vehicle (HOV) roads/lanes, ferries or other types of transportation links.

Figure 13:
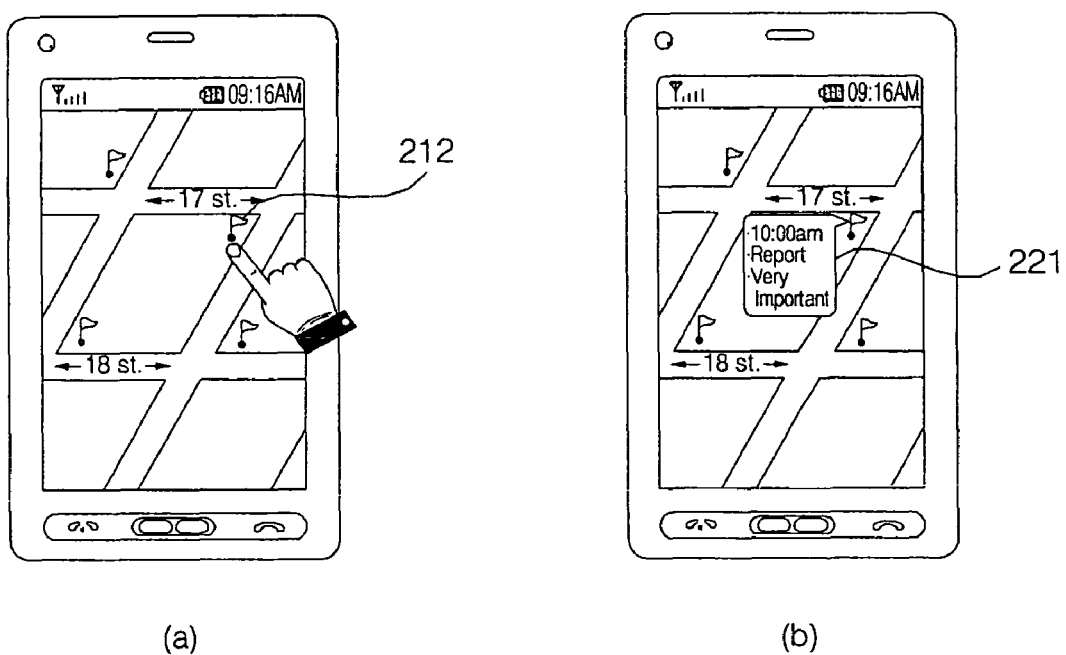
FIG. 13 illustrates diagrams for explaining how to display schedule information corresponding to a flag in response to a flag selection command.

FIG. 13 illustrates diagrams for explaining how to display schedule information corresponding to a flag in response to a command to select a flag. Referring to FIG. 13(a), if a schedule map is displayed on a touch screen and a flag 212 displayed on the schedule map is touched, the control unit 180 may determine that a command to select the flag 212 has been issued by a user. Alternatively, if the proximity sensor 141 detects an object (such as the user's finger) approaching and nearby the flag 212, the control unit 180 may determine that a command to select the flag 212 has been issued by the user. Still alternatively, if a pointer is moved to the flag 212, the control unit 180 may determine that a command to select the flag 212 has been issued by the user.

Referring to FIG. 13(b), if the flag 212 is chosen by the user, as illustrated in FIG. 13(a), the control unit 180 may display schedule information corresponding to the flag 212. For example, the control unit 180 may display schedule time information of a scheduled event corresponding to the flag 212, a number of things to do in association with the scheduled event and the importance of the scheduled event in a popup window 221. Other types of metadata may shown in addition to or in place of the above-described items. The user may determine the type of schedule information to be displayed in a popup window in response to the selection of a flag.

Once the flag 212 is chosen, the control unit 180 may change the color of the flag 212 or the clarity or the shape of the flag 212.

The control unit 180 may display a schedule-related application menu upon receiving a command to select a flag. Also, the control unit 180 may adjust schedule or execute a schedule-related application upon receiving a command to select a flag.

FIGS. 14 through 16 illustrate diagrams for explaining the adjustment of schedule or the execution of a schedule-related application in response to a command to select a flag when a schedule map is displayed on a touch screen.

Referring to FIGS. 14 through 16, if a schedule map is displayed a touch screen, the control unit 180 may determine whether and how any one of a plurality of flags displayed on the schedule map has been touched by a user. Thereafter, the control unit 180 may perform one of the following operations according to the results of the determination: displaying schedule information corresponding to the touched flag or a schedule-related application menu, adjusting schedule and executing a schedule-related application.

For example, referring to FIG. 14(a), if a touch input to a flag 212 is detected, the control unit 180 may determine how long the flag 212 has been touched.

If control unit 180 determines that the flag 212 has been touched for a long time, the control unit 180 may display a popup window 222 for rescheduling or canceling a scheduled event corresponding to the flag 212, as illustrated in FIG. 14(b).

Accordingly, by using the popup window 222, the user may cancel the scheduled event corresponding to the flag 212 (1. Cancel), may change the time of the scheduled event corresponding to the flag 212 (2. Time), may change the place of the scheduled event corresponding to the flag 212 (3. Loca.), or may change other schedule information regarding the scheduled event corresponding to the flag 212 (4. Edit). Other schedule event actions may also be performed via popup window 222.

Alternatively, referring to FIG. 15(a), if a touch input to a flag 212 is detected, the control unit 180 may determine the number of times the flag 212 has been touched.

If the flag 212 has been touched more than a predefined number of times, the control unit 180 may execute an application for sending a message or email to the parties of a scheduled event corresponding to the flag 212, as indicated by reference numeral 213 of FIG. 15(b).

Still alternatively, referring to FIG. 16(a), if a touch input to a flag 212 is detected, the control unit 180 may determine how the flag 212 has been touched. The control unit 180 may display a plurality of tabs 231 through 233 respectively corresponding to a plurality of schedule maps for different dates in a display region. Referring to FIG. 16(a), a schedule map 242 corresponding to the tab 232 is displayed in the whole display region.

More specifically, if the tab 232 corresponding to the date of Jul. 12, 2008 is chosen, the schedule map 242 corresponding to a plurality of events scheduled on Jul. 12, 2008 may be displayed in the display region. If a touch input to a flag 212 is detected, the control unit 180 may determine whether the flag 212 has been touched and then dragged into the tab 233.

If control unit 180 determines that the flag 212 has been touched and then dragged into the tab 233, the control unit 180 may display a schedule map 243 corresponding to the tab 233, instead of the schedule map 242. Thereafter, the control unit 180 may change the date of a scheduled event corresponding to the flag 212 from Jul. 12, 2008 to Jul. 13, 2008.

Thereafter, referring to FIG. 16(b), the control unit 180 may change the color of the flag 212 in order to indicate that the scheduled event corresponding to the flag 212 has been rescheduled. In addition, the control unit 180 may display adjusted schedule information corresponding to the flag 212 in a popup window 221. Thus, the user may easily obtain the adjusted schedule information corresponding to the flag 212 from the popup window 221.

The present invention, however, is not restricted to the exemplary embodiments of FIGS. 14 through 15. For example, the control unit 180 may reschedule or cancel all scheduled events according to how a touch screen has been touched by the user.

Figure 17:
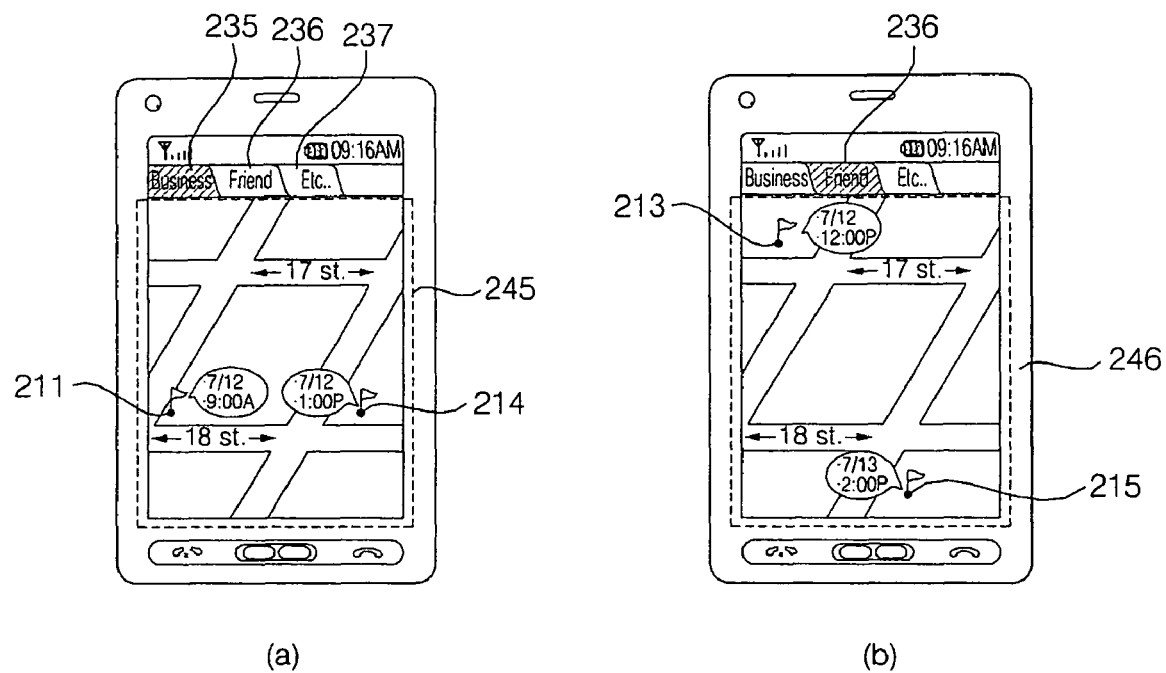
FIG. 17 illustrates diagrams of screen images including a schedule map with a plurality of tabs.

FIG. 17 illustrates diagrams of screen images including a schedule map with a plurality of tabs 235 through 237. Referring to FIG. 17(a), if a tab 'Business' 235 is chosen, the control unit 180 may display a schedule map 245 including flags 211 and 214 in a display region. Each of the flags 211 and 213 represents a business-related schedule place. The control unit 180 may display schedule information corresponding to each of the flags 211 and 214 in a popup window.

Referring to FIG. 17(b), if a tab 'Friend' 236 is chosen, the control unit 180 may display a schedule map 246 including flags 213 and 219 in the display region. Each of the flags 213 and 215 represents a schedule place for a gathering of friends. The control unit 180 may display schedule information corresponding to each of the flags 213 and 215 in a popup window.

Referring to FIGS. 17(a) and 17(b), the control unit 180 may display the date of each scheduled event in a popup window because the schedule maps 245 and 246 are not date-based schedule maps. The type of schedule information that can be displayed in a popup window may vary according to the type of schedule map displayed by the control unit 180.

Figure 18:
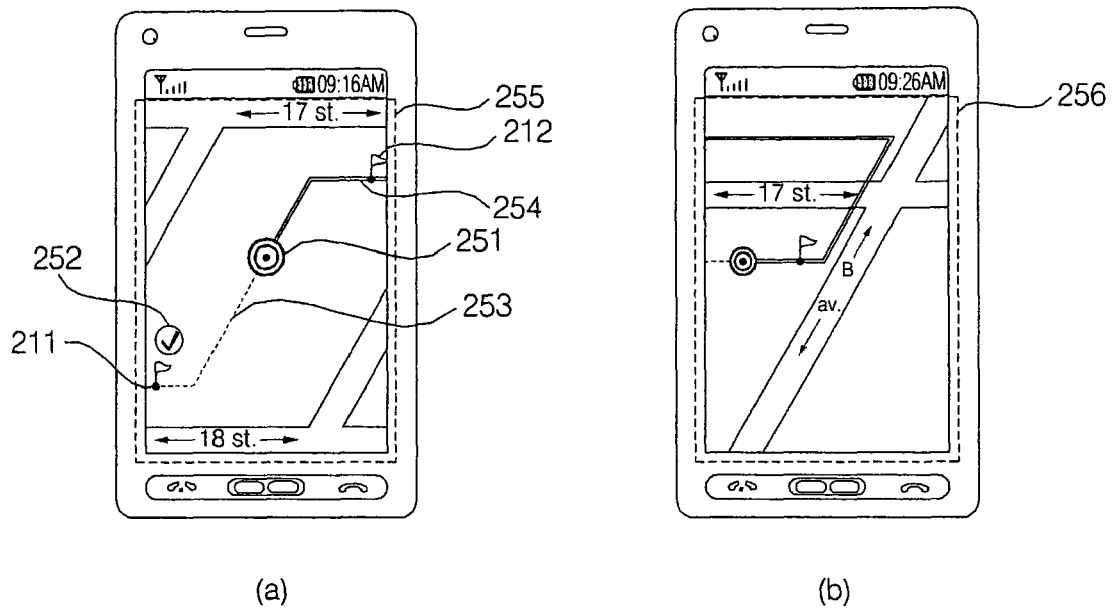
FIG. 18 illustrates diagrams for explaining how to display a current location on a schedule map.

FIG. 18 illustrates diagrams for explaining how to display a current location of the mobile terminal 100 on a schedule map. Referring to FIG. 18(a), the control unit 180 may display a current location icon 251 indicating a current location of the mobile terminal 100 in a display region with reference to current location information received from an external source. In addition, the control unit 180 may display a finished schedule icon 252 for a flag 211 corresponding to a scheduled event that has already been attended by a user.

In addition, the control unit 180 may indicate the current location of the mobile terminal 100 by varying the shape of a route between the flag 211 and a flag 212. More specifically, referring to FIG. 18(a), the control unit 180 may render a route 253 already traveled by the user as a dotted line and may render a route 254 yet to be traveled by the user as a double solid line.

Referring to FIGS. 18(a) and 18(b), if the location of the mobile terminal 100 changes, the control unit 180 may replace a schedule map 254 with a schedule map 256 according to the change in the location of the mobile terminal 100. Alternatively, the control unit 180 may change the scale of the schedule map 254 according to the change in the location of the mobile terminal 100. The scale of the schedule map 254 may also change according to changes to congestion or other route characteristic changes.

Figure 19:
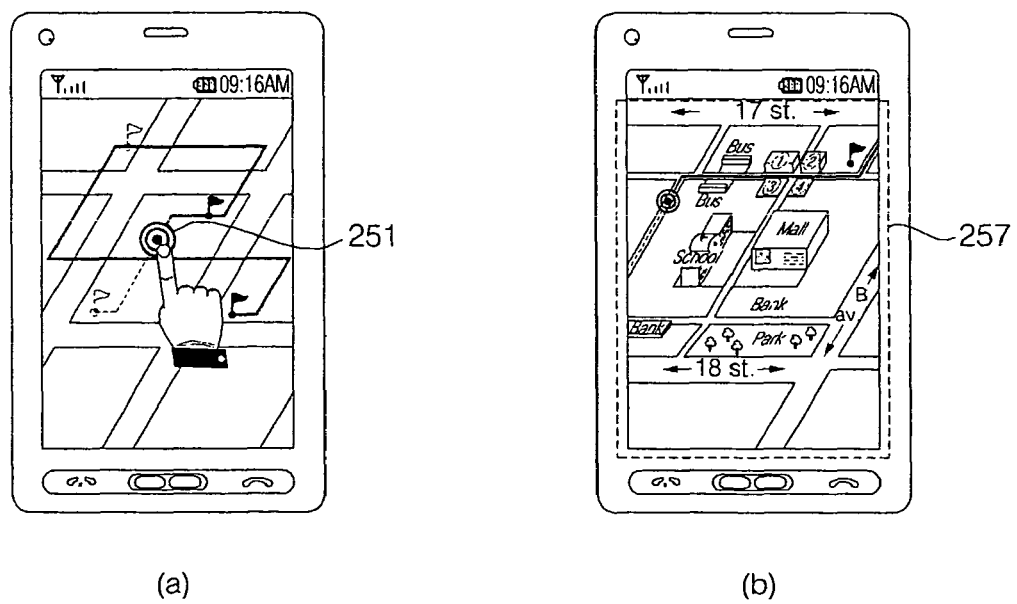
FIG. 19 illustrates diagrams for explaining how to display a detailed schedule map based on current location information.

FIG. 19 illustrates diagrams for explaining how to display a detailed schedule map based on current location information. Referring to FIG. 19(a), if a schedule map is displayed on a touch screen and a current location icon 251 is touched, the control unit 180 may determine that a command to display a detailed schedule map has been issued by a user.

Referring to FIG. 19(b), the control unit 180 may display a high-scale schedule map 257 in a display region upon receiving a command to display a detailed schedule map.

The user may issue a command to search for means of transportation available to a current location or a destination schedule place to the mobile terminal 100. Then, the control unit 180 may display information indicating means of transportation available to the current location or the destination schedule place in the display region. For example, the control unit 180 may display a subway route map or a bus route map corresponding to the current location in the display region.

FIG. 20 illustrates diagrams of screen images including a schedule map displayed as an idle screen or a popup window. Referring to FIG. 20(a), the control unit 180 may display a schedule map 257 showing a current location of the mobile terminal 100 on an idle screen 258 at regular intervals of time. Alternatively, referring to FIG. 20(b), the control unit 180 may display a schedule map showing a current location of the mobile terminal 100 as a popup window 259.

If a user manipulates the user input unit 130, the control unit 180 may display a schedule map showing a plurality of schedule places, a schedule map showing a current location of the mobile terminal 100 or a simplified version thereof as a popup window, and this will be described later in further detail with reference to FIG. 22. Examples of the user input unit 130 include a hard key (such as a side key) of the mobile terminal 100 and a soft key displayed in a display region. Thus, the user may view a schedule map showing a plurality of schedule places or a schedule map showing a current location of the mobile terminal 100 while executing other applications.

Therefore, a user may view a schedule map or a simplified version of a schedule map as the schedule map or the simplified version of the schedule map is displayed in a popup window at regular intervals of time. A user may also view a schedule map corresponding to the current location of the mobile terminal 100 at regular intervals of time.

Figure 21:
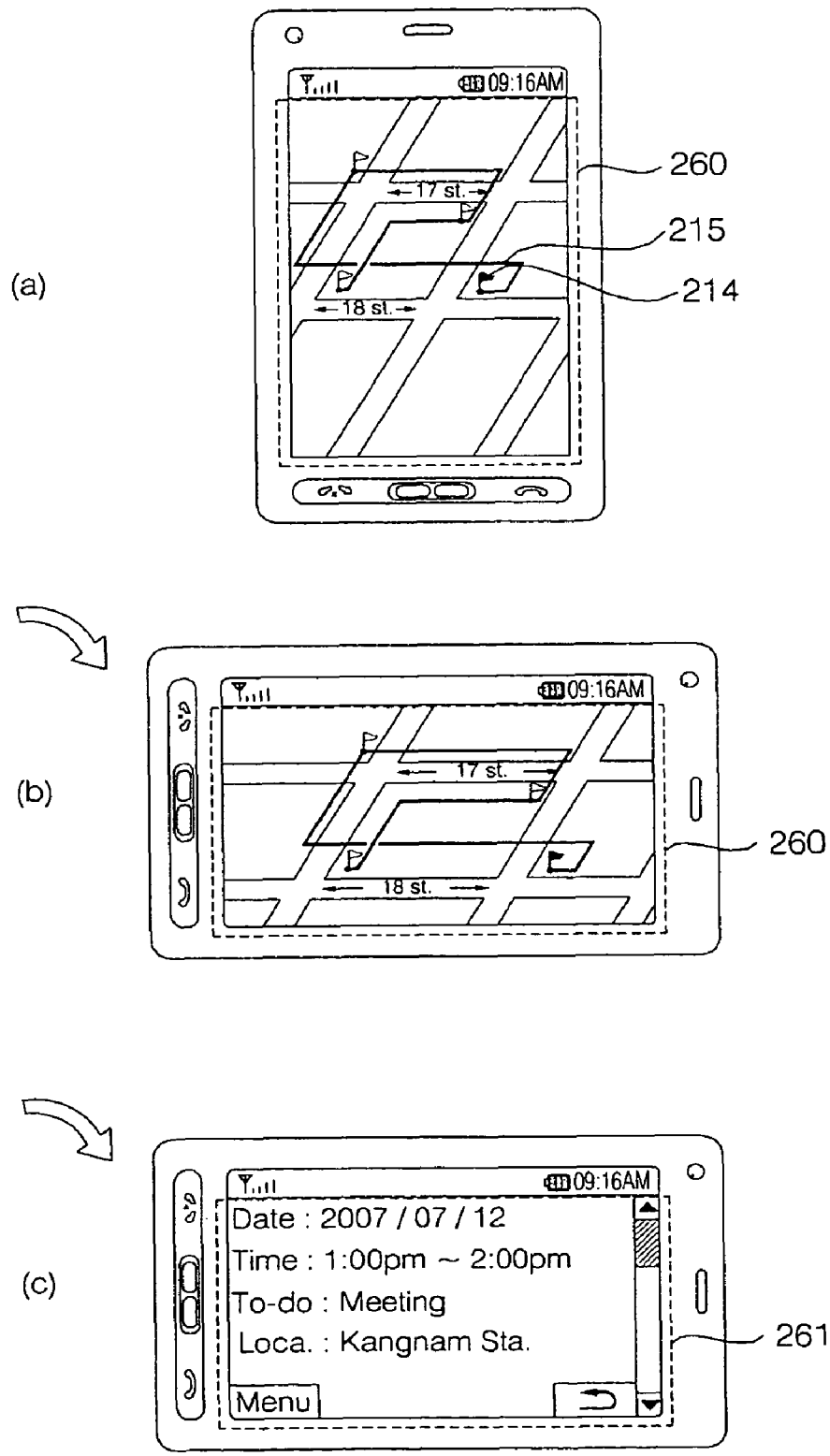
FIG. 21 illustrates diagrams of screen images displayed when a mobile terminal is rotated.

FIG. 21 illustrates diagrams of screen images displayed when the mobile terminal 100 is rotated. Referring to FIG. 21, the gyro sensor 142 may generate a gyro signal upon detecting the movement of the mobile terminal 100. The control unit 180 may detect motion information of the mobile terminal 100 from the gyro signal generated by the gyro sensor 142. The control unit 180 may change a screen image displayed in a display region according to the detected motion information.

More specifically, referring to FIG. 21(a), the control unit 180 displays a schedule map 260 in the display region. If the mobile terminal 100 is rotated clockwise by 90 degrees, the control unit 180 may determine the rotation angle and the rotation direction of the mobile terminal 100 based on a gyro signal generated by the gyro sensor 142.

Thereafter, the control unit 180 may rotate the schedule map 260 in accordance with the rotation angle and the rotation direction of the mobile terminal 100, as illustrated in FIG. 21(b).

Alternatively, the control unit 180 may display schedule information 261 corresponding to a flag chosen by a user, i.e., a flag 214, instead of the schedule map 260, in the display region, as illustrated in FIG. 21(c).

Figure 22:
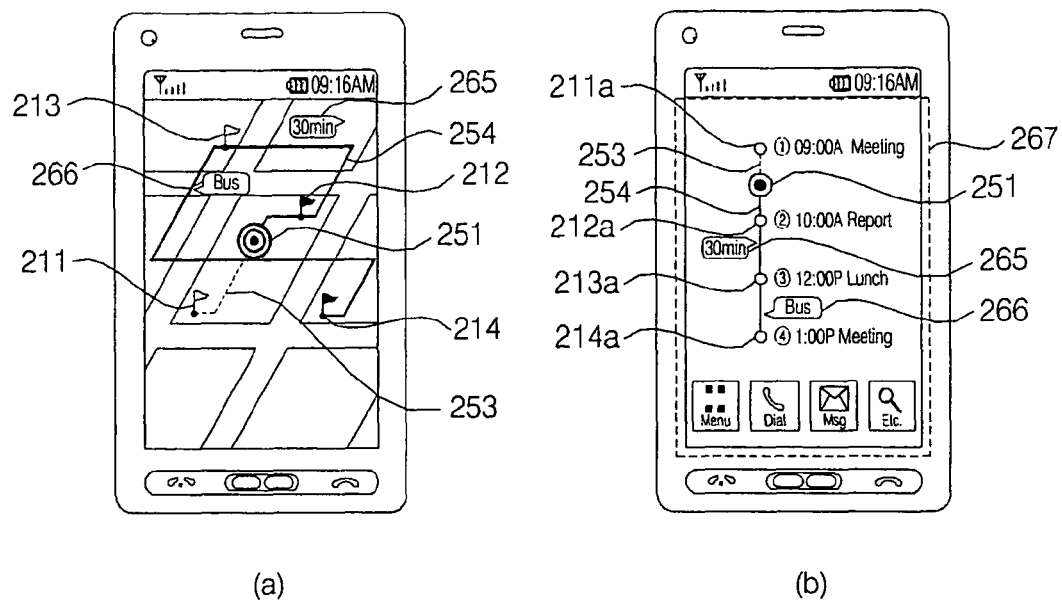
FIG. 22 illustrates diagrams for explaining how to simplify a schedule map into a block diagram or a signal flow graph.

FIG. 22 illustrates diagrams for explaining how to simplify a schedule map into a block diagram or a signal flow graph. Referring to FIG. 22(a), the control unit 180 may display a schedule map showing a plurality of flags 211 through 214 respectively representing a plurality of schedule places, a current location icon 251, a route 253 already traveled by a user, a route 254 yet to be traveled by the user, a thought balloon 265 indicating an estimated amount of time to move from the schedule place corresponding to the flag 212 to the schedule place corresponding to the flag 213, and a thought balloon 266 indicating means of transportation recommended for moving from the schedule place corresponding to the flag 213 to the schedule place corresponding to the flag 214.

The control unit 180 may simplify the schedule map shown in FIG. 22(a) into a block diagram shown in FIG. 22(b). Referring to FIG. 22(b), the control unit 180 may display a timeline diagram showing a plurality of nodes 211a through 214a respectively corresponding to the flags 211 through 214, the current location icon 251, the routes 253 and 254, and the thought balloons 265 and 266 on an idle screen 267.

Thus, the user may easily obtain current location information or traffic information from the timeline diagram shown in FIG. 22.

Figure 23:
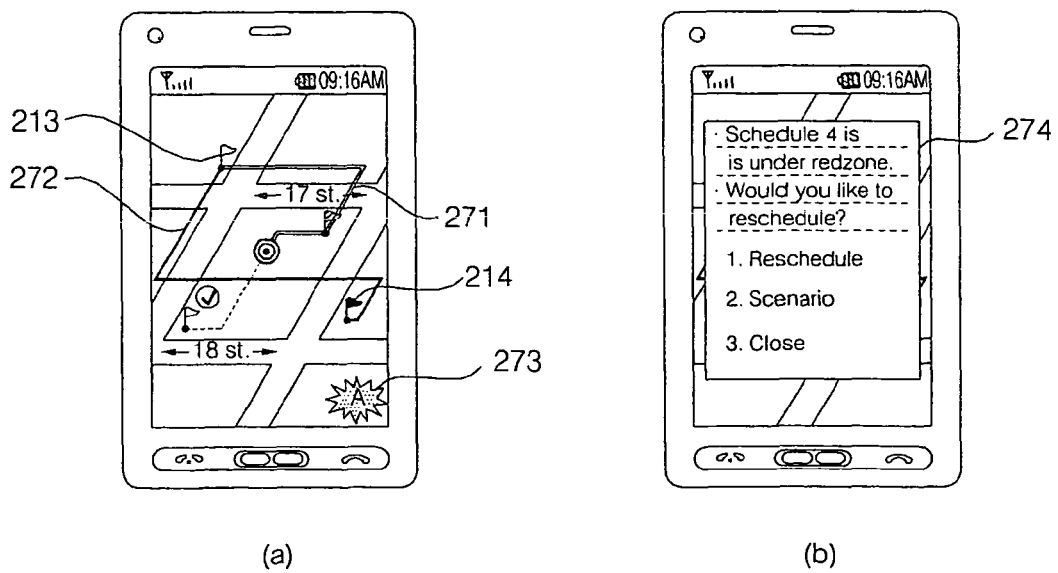
FIGS. 23 and 24 illustrates diagrams for explaining how to adjust schedule when control unit 180 determines based on current location information and traffic information that a user cannot arrive at a scheduled place in time.
Figure 24:
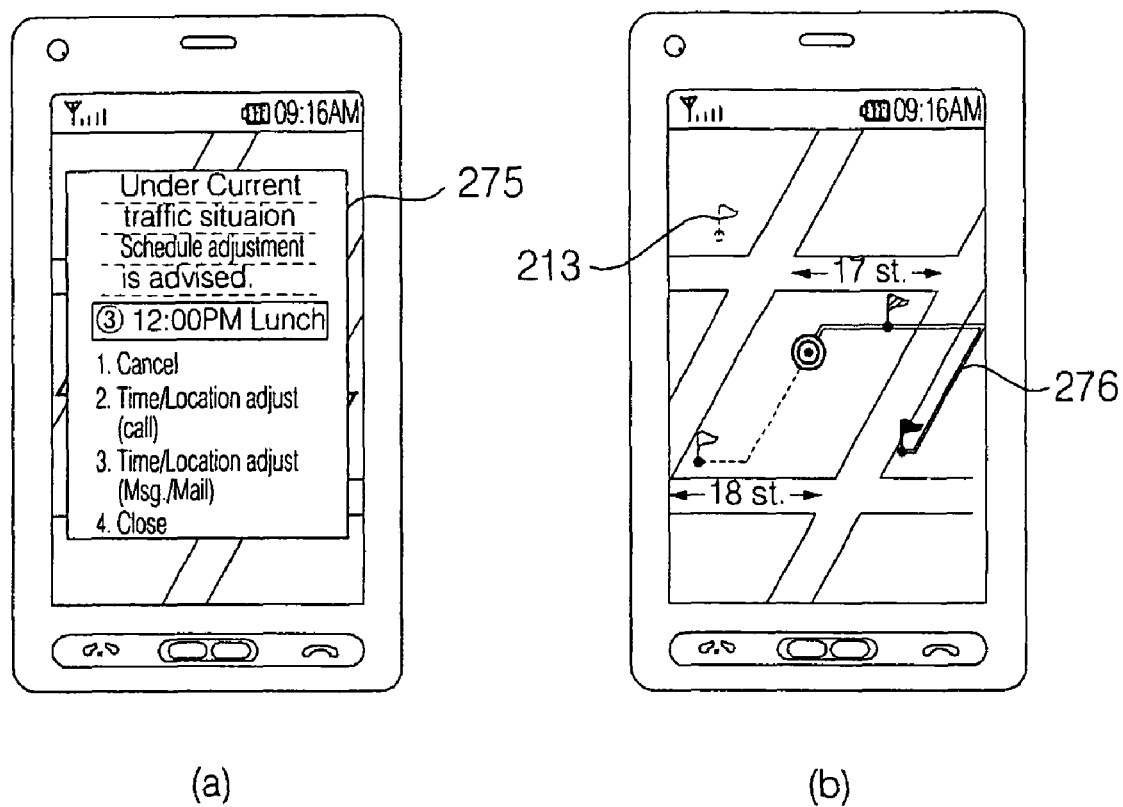

FIGS. 23 and 24 illustrate diagrams for explaining how to adjust schedule using schedule adjustment information when control unit 180 determines based on current location information and traffic information that a user cannot arrive at a schedule place in time. Referring to FIGS. 23 and 24, the schedule adjustment information may provide at least one of a plurality of scenarios for postponing a scheduled event, changing the time of the scheduled event, changing the place of the scheduled event, and canceling the scheduled event, and information indicating means of transportation available or recommended. If control unit 180 determines that the user cannot arrive at a schedule place in time, the control unit 180 may offer various scenarios or alternatives for adjusting schedule and may thus allow the user to choose one of the various scenarios or alternatives.

If control unit 180 determines based on current location information or traffic information that the user can arrive at a schedule place in time, the control unit 180 may render a route from a current location of the mobile terminal 100 to the schedule place as a double solid line. For example, referring to FIG. 23(a), a route from the current location of the mobile terminal 100 to a schedule place corresponding to a third flag 213 is rendered as a double solid line because the control unit 180 determines that the user can arrive at a schedule place corresponding to the third flag 213 in time.

On the other hand, if control unit 180 determines based on current location information or traffic information that the user cannot arrive at a schedule place in time, the control unit 180 may render a route from the current location of the mobile terminal 100 to the schedule place in a dark shade. For example, referring to FIG. 23(a), a route from the current location of the mobile terminal 100 to a schedule place corresponding to a fourth flag 214 is rendered in a dark shade because the control unit 180 determines that the user cannot arrive at a schedule place corresponding to the fourth flag 214 in time.

Referring to FIG. 23(a), the control unit 180 may display a notification icon 273 in a display region. The user may learn from the notification icon 273 whether, among a plurality of schedule places shown in a schedule map, there is a schedule place at which the user cannot arrive at time. Icon 273 may be animated (e.g., blink, flash, rotate, etc.)

More specifically, if the user touches the notification icon 273 or manipulates a hard key or a soft key corresponding to the notification icon 273, the control unit 180 may display a notification window 274 in the display region, as illustrated in FIG. 23(b).

If control unit 180 determines based on current location information or traffic information that the user cannot arrive at schedule place 4 corresponding to the fourth flag 214 in time, the control unit 180 may notify the user that schedule place 4 is classified as a red zone. Thereafter, the control unit 180 may allow the user to adjust schedule with or without the use of schedule information provided by the mobile terminal 100.

If the user chooses '1.reschedule' from the notification window 274, the control unit 180 may display a schedule list and may allow the user to perform schedule adjustment on a schedule item of the schedule list corresponding to schedule place 4. If the user chooses '2.scenario' from the notification window 274, the control unit 180 may provide schedule adjustment information for allowing the user to adjust schedule in consideration of current location information or traffic information and the importance of each schedule item of the schedule list. If the user chooses '3.close' from the notification window 274, the control unit 180 may close the notification window 274.

FIG. 24 illustrates diagrams for explaining various scenarios offered by the control unit 180 when the user chooses '2.scenario' from the notification window 274. Referring to FIG. 24(a), the control unit 180 may offer various scenarios for adjusting schedule by using a text-based popup window 275.

The priority level of the scheduled event corresponding to the fourth flag 214 may be higher than the priority level of a scheduled event corresponding to the fourth flag 213. In this case, the control unit 180 may render the fourth flag 214 in a darker shade than the third flag 213. Thereafter, the control unit 180 may provide various scenarios for performing schedule adjustment on the scheduled event corresponding to the third flag 213 (such as canceling the scheduled event corresponding to the third flag 213 and changing the time and place of the scheduled event corresponding to the third flag 213) using the popup window 275.

If the user chooses '1.Cancel' from the popup window 275, the control unit 180 may delete the scheduled event corresponding to the third flag 213 from a schedule list.

Thereafter, referring to FIG. 24(b), the control unit 180 may update a schedule map in accordance with an update in the schedule list. More specifically, the control unit 180 may display a dotted outline of a flag as the third flag 213 in order to indicate that the scheduled event corresponding to the third flag 213 has been deleted from the schedule list. In addition, the control unit 180 may display a new route 276 to the schedule place corresponding to the fourth flag 214 on the schedule map. The control unit 180 may render the new route 276 as a double solid line in order to indicate that the user can arrive at the schedule place corresponding to the fourth flag in time.

On the other hand, if the user chooses '2.Time/Location adjust (call)' from the popup window 275, the control unit 180 may make a call to the parties of the scheduled event corresponding to the third flag 213. Then, the user may adjust the time or the place of the scheduled event corresponding to the third flag 213 after consultation with the parties of the scheduled event corresponding to the third flag 213. The user may look up the phone numbers of the parties of the scheduled event corresponding to the third flag 213 and may store the looked-up phone numbers in advance as schedule information regarding the scheduled event corresponding to the third flag 213. In this case, the control unit 180 may make a call to the stored phone numbers.

If the user chooses '3.Time/Location adjust (Msg./Mail)' from the popup window 275, the control unit 180 may advance or postpone the scheduled event corresponding to the third flag 213 or may change the place of the scheduled event corresponding to the third flag 213. Thereafter, the control unit 180 may provide adjusted schedule information regarding the scheduled event corresponding to the third flag 213 to the parties of the scheduled event corresponding to the third flag 213 by sending a message or email. The user may look up the phone numbers or the email addresses of the parties of the scheduled event corresponding to the third flag 213 and may store the looked-up phone numbers or email addresses in advance as schedule information regarding the scheduled event corresponding to the third flag 213. In this case, the control unit 180 may send a message or email to the stored phone numbers or the stored email addresses.

In short, referring to FIGS. 23 and 24, the control unit 180 may offer various scenarios for adjusting schedule such as postponing a scheduled event, changing the time and/or place of the scheduled event, and canceling the scheduled event. In addition, the control unit 180 may provide information indicating means of transportation available or recommended or information necessary for adjusting schedule.

Figure 25:
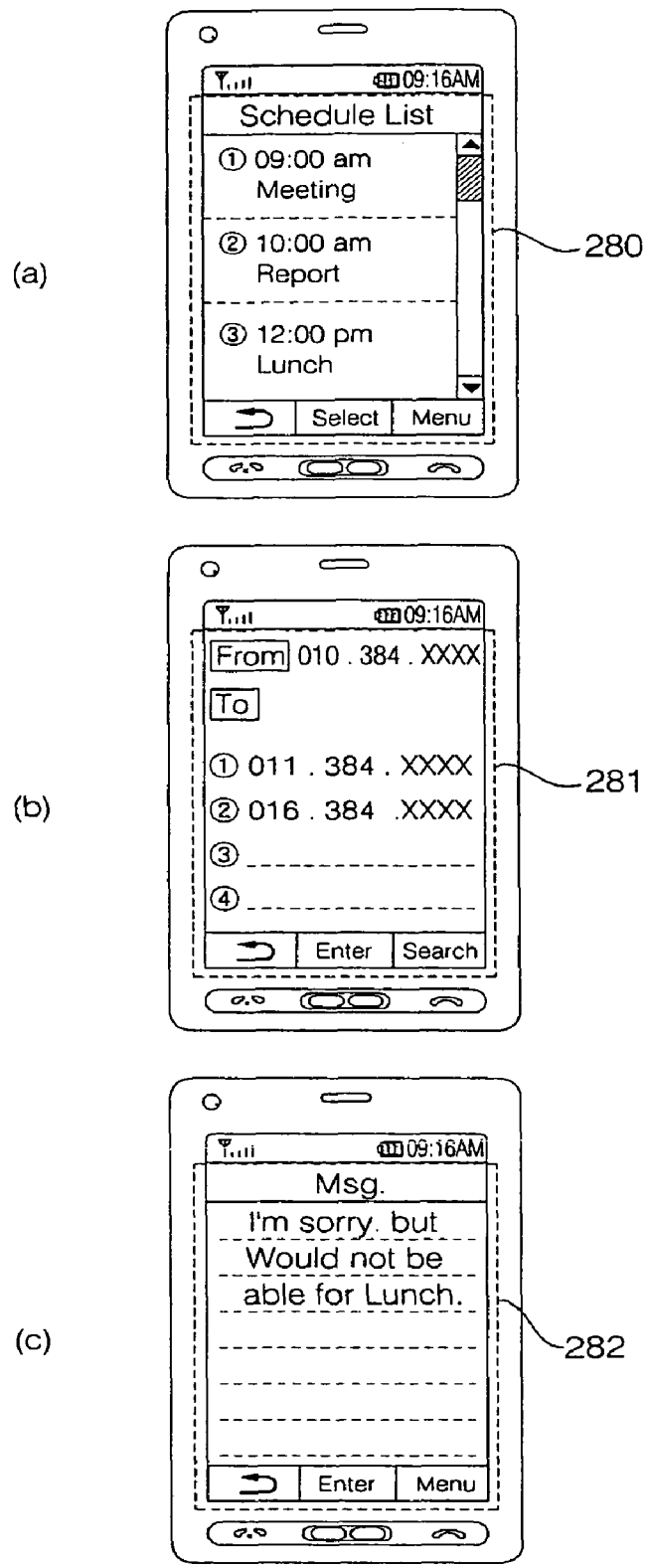
FIG. 25 illustrates diagrams for explaining the transmission of adjusted schedule information to the parties of a scheduled event when a flag corresponding to the scheduled event is deleted.

FIG. 25 illustrates diagrams for explaining the transmission of adjusted schedule information to the parties of a scheduled event when a flag corresponding to the scheduled event is deleted. Referring to FIG. 25(a), if the scheduled event corresponding to the third flag 213 shown in FIG. 24 is canceled, a schedule item corresponding to the third flag 213 may be deleted from a schedule list screen 280.

Thereafter, an application for sending a message to the parties of the scheduled event corresponding to the third flag 213 may be executed, as illustrated in FIG. 25(b).

The control unit 180 may create a default message in advance and may thus send the default message to the parties of the scheduled event corresponding to the third flag 213, as illustrated in FIG. 25(c).

A user may transmit a schedule map to a predetermined phone number or email address. The user may choose a desired portion of the schedule map to be transmitted. Thereafter, the user may issue a command to execute an application for sending a message or email. Thereafter, the user may input a phone number or an email address to a message/email transmission application execution screen. Then, the control unit 180 may transmit the schedule map portion chosen by the user to the phone number or the email address input by the user.

The mobile terminal according to the present invention and the method of controlling a mobile terminal according to the present invention are not restricted to the exemplary embodiments set forth herein. Therefore, variations and combinations of the exemplary embodiments set forth herein may fall within the scope of the present invention.

The present invention can be realized as computer-readable code written on a computer-readable recording medium included in a mobile terminal such as a mobile station modem (MSM). The computer-readable recording medium may be any type of recording device in which data is stored in a computer-readable manner. Examples of the computer-readable recording medium include a ROM, a RAM, a CD-ROM, a magnetic tape, a floppy disc, and an optical data storage. The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal capable of managing schedule, the method comprising:
   receiving user supplied schedule information corresponding to plural events included in a schedule, each of the plural events having a corresponding schedule place, the schedule information of each of the plural events including a scheduled time that a user of the mobile terminal is to arrive at a corresponding one of the schedule places;
   obtaining current location information and traffic information;
   displaying a schedule map in a display region of the mobile terminal, the schedule map including a flag for each of the plural schedule places and a route on the schedule map from the current location to each of the plural schedule places in a time-ordered sequence based on the traffic information;
   determining whether the user can arrive at each of the plural schedule places at the corresponding scheduled time based on the current location information and the traffic information and producing a first determination result;
   adding a new event at a new place to the schedule based on a user input to one of the schedule map and a displayed schedule, the new event including a corresponding new place time of arrival;
   updating the schedule map with a flag representing the new place and adding corresponding new schedule information to the schedule as a new schedule item;
   rearranging the route displayed on the schedule map to include the new place based on the new place time of arrival;
   displaying the rearranged route;
   determining whether the user can arrive at each of the plural schedule places in the rearranged route at the corresponding scheduled time based on the traffic information and producing a second determination result;
   displaying schedule notification information or schedule adjustment information in the display region of the mobile terminal according to the second determination result;
   displaying an icon indicating that the user cannot arrive at each of the plural schedule places in the rearranged route at the corresponding scheduled time based on the traffic information;
   changing a display characteristic a flag of the one of the plural schedule places to indicate that that the user cannot arrive at the one of the plural schedule places; and
   in response to a touch to the icon, displaying a control window providing options for further adjusting the rearranged route.

2. The method of claim 1, further comprising:
   displaying each of the flags with one of a clarity, color and shape representing a corresponding one of a schedule information item, an event importance, an event type, an event party, information indicating whether a corresponding event has been adjusted and information indicating whether the corresponding event has already been achieved.

3. The method of claim 1, further comprising:
   displaying the route and the rearranged route with at least one of a clarity, color and shape representing one of a schedule information item, corresponding route destination information, route traffic information, and the current location information.

4. The method of claim 1, further comprising:
selecting one displayed flag by determining whether a proximity signal indicating that there is an object within a predetermined distance of the one displayed flag has been generated by a proximity sensor or whether a command to select the one displayed flag has been issued; and
displaying schedule information corresponding to the one displayed flag upon detecting the proximity signal or the command.

5. The method of claim 4, further comprising:
changing at least one of a clarity, color and shape of the one displayed flag upon detecting the proximity signal or the command.

6. The method of claim 1, wherein the display region is a region of a touch screen, the method further comprising:
determining whether and how a displayed flag has been touched to produce a third determination result;
displaying schedule information corresponding to the touched flag or a schedule-related application menu; and
adjusting the schedule information corresponding to the touched flag or executing a schedule-related application according to the third determination result.

7. The method of claim 6, wherein
the step of determining whether and how a displayed flag has been touched comprises determining whether that the displayed flag has been touched more than a predefined number of times; and
the step of displaying schedule information corresponding to the touched flag or a schedule-related application menu comprises, when the displayed flag has been touched more than the predefined number of times, executing an application for transmitting a message or email containing data for remotely displaying the schedule map with the touched flag to parties of an event corresponding to the touched flag.

8. The method of claim 6, further comprising:
displaying a number of tabs respectively corresponding to a number of schedule maps for different dates in the display region, wherein
the step of determining whether and how a displayed flag has been touched comprises determining whether the touched flag has been dragged into one of the tabs, and
the step of displaying schedule information corresponding to the touched flag or a schedule-related application menu comprises
when the touched flag has been dragged into one of the tabs, moving the touched flag from a schedule map currently being displayed in the display region to a schedule map corresponding to the tab into which the touched flag has been dragged, and
modifying schedule information corresponding to the touched flag according to time information of the schedule map corresponding to the tab into which the touched flag has been dragged.

9. The method of claim 1, further comprising:
displaying a time line diagram or a signal flow graph showing the new place and the route.

10. The method of claim 1, further comprising:
displaying in the display region a number of tabs respectively corresponding to a number of maps for different dates; and
when one of the tabs is chosen, displaying in the display region a schedule map corresponding to the chosen tab.

11. The method of claim 1, further comprising:
displaying in the display region a number of tabs respectively corresponding to a number of maps for different regions, different schedule times, different schedule importance levels, different schedule types or different schedule parties, or a number of maps displaying one or more flags, the one or more flags corresponding to an adjustable schedule event or an achieved schedule event; and
when one of the tabs is chosen, displaying a schedule map corresponding to the chosen tab in the display region.

12. The method of claim 1, further comprising:
displaying a current location of the mobile terminal on the schedule map.

13. The method of claim 12, further comprising:
moving the schedule map or changing a scale of the schedule map in accordance with a change in the current location of the mobile terminal.

14. The method of claim 1, wherein the step of displaying the schedule map comprises:
displaying a part of the schedule map corresponding to a current location of the mobile terminal on an idle screen or in a popup window at regular intervals of time.

15. The method of claim 1, further comprising:
determining whether a gyro signal indicating the movement of the mobile terminal has been generated by a gyro sensor; and
rotating the schedule map in accordance with a direction of the movement of the mobile terminal based on motion information extracted from the gyro signal.

16. The method of claim 1, further comprising:
determining that a command to transmit the schedule map has been issued; and
executing an application for sending a message or email to a phone number or an email address received along with the command to transmit the schedule map.

17. The method of claim 1, wherein the schedule information includes one of an event importance, an event type, information regarding parties of the scheduled event, information indicating whether the scheduled event has been adjusted, information indicating whether the scheduled event has already been completed, an optimal route to the place, the current location information and the traffic information.

18. The method of claim 17, wherein the traffic information includes at least one of traffic condition information of the place, information indicating a mode of transportation available or recommended, an estimated time to get to the place, information indicating whether the user can arrive at one of the schedule places on corresponding schedule, and address or other location information of the one of the schedule places.

19. The method of claim 1, wherein the schedule adjustment information includes at least one of information for postponing a scheduled event, information for changing a time of the scheduled event, information for changing a place of the scheduled event, and information for canceling the scheduled event and information indicating a recommended or available mode of transportation.

20. The method of claim 19, further comprising:
adjusting the scheduled event by postponing the scheduled event, changing the time of the scheduled event, changing the place of the scheduled event, or canceling the scheduled event.

21. The method of claim 20, further comprising:
when a schedule adjustment is performed on the scheduled event, either transmitting adjusted schedule information to parties of the adjusted scheduled event by sending a message or email or requesting a call.

22. A mobile terminal capable of managing schedule, the mobile terminal comprising:
- a display having a display region; and
- a controller operatively connected to the display and configured to
  - receive user supplied schedule information corresponding to plural events included in a schedule, each of the plural events having a corresponding schedule place, the schedule information of each of the plural events including a scheduled time that a user of the mobile terminal is to arrive at a corresponding one of the schedule places;
  - obtain current location information and traffic information,
  - display a schedule map in the display region, the schedule map including a flag for each of the plural schedule places and a route on the schedule map from the current location to each of the plural schedule places in a time-ordered sequence based on the traffic information,
  - determine whether the user can arrive at each of the plural schedule places at the corresponding scheduled time based on the current location information and the traffic information and produce a first determination result,
  - add a new event at a new place to the schedule based on a user input to one of the schedule map and a displayed schedule, the new event including a corresponding new place time of arrival,
  - update the schedule map with a flag representing the new place and add corresponding new schedule information to the schedule as a new schedule item,
  - rearrange the route displayed on the schedule map to include the new place based on the new place time of arrival,
  - display the rearranged route,
  - determine whether the user can arrive at each of the plural schedule places in the rearranged route at the corresponding scheduled time based on the traffic information and produce a second determination result,
  - display schedule notification information or schedule adjustment information in the display region according to the second determination result,
  - display an icon indicating that the user cannot arrive at each of the plural schedule places in the rearranged route at the corresponding scheduled time based on the traffic information,
  - change a display characteristic a flag of the one of the plural schedule places to indicate that that the user cannot arrive at the one of the plural schedule places, and
  - in response to a touch to the icon, display a control window providing options for further adjusting the rearranged route.

23. The mobile terminal of claim 22, wherein the controller is configured to display each of the flags with one of a clarity, color and shape representing a corresponding one of a schedule information item, an event importance, an event type, an event party, information indicating whether a corresponding event has been adjusted and information indicating whether the corresponding event has already been achieved.

24. The mobile terminal of claim 22, wherein the controller is configured to display the route and the rearranged route with at least one of a clarity, color and shape representing one of a schedule information item, corresponding route destination information, route traffic information, and the current location information.

25. The mobile terminal of claim 22, further comprising:
- a proximity sensor, wherein the controller is configured to
  - select one displayed flag by determining whether a proximity signal indicating that there is an object within a predetermined distance of the one displayed flag has been generated by the proximity sensor or whether a command to select the one displayed flag has been issued; and
  - display schedule information corresponding to the one displayed flag upon detecting the proximity signal or the command.

26. The mobile terminal of claim 25, wherein the controller is configured to change at least one of a clarity, color and shape of the one displayed flag upon detecting the proximity signal or the command.

27. The mobile terminal of claim 22, wherein the controller is configured to
- determine whether and how a displayed flag has been touched to produce a third determination result,
- display schedule information corresponding to the touched flag or a schedule-related application menu, and
- adjust the schedule information corresponding to the touched flag or execute a schedule-related application according to the third determination result.

28. The mobile terminal of claim 27, wherein the controller is configured to
- determine that the displayed flag has been touched more than a predefined number of times, and
- execute an application for transmitting a message or email containing data for remotely displaying the schedule map with the touched flag to parties of an event corresponding to the touched flag when the displayed flag has been touched more than the predefined number of times.

29. The mobile terminal of claim 27, wherein the controller is configured to
- display a number of tabs respectively corresponding to a number of schedule maps for different dates in the display region,
- determine whether the touched flag has been dragged into one of the tabs, and
- when the touched flag has been dragged into one of the tabs, move the touched flag from a schedule map currently being displayed in the display region to a schedule map corresponding to the tab into which the touched flag has been dragged, and modify schedule information corresponding to the touched flag according to time information of the schedule map corresponding to the tab into which the touched flag has been dragged.

30. The mobile terminal of claim 22, wherein the controller is configured to display a time line diagram or a signal flow graph corresponding to the new place and the route.

31. The mobile terminal of claim 22, wherein the controller is configured to
- display in the display region a number of tabs respectively corresponding to a number of maps for different dates, and
- when one of the tabs is chosen, display in the display region a schedule map corresponding to the chosen tab.

32. The mobile terminal of claim 22, wherein the controller is configured to
- display in the display region a number of tabs respectively corresponding to a number of maps for different regions, different schedule times, different schedule importance levels, different schedule types or different schedule parties, or a number of maps displaying one or more flags, the one or more flags corresponding to an adjustable schedule event or an achieved schedule event, and when one of the tabs is chosen, display a schedule map corresponding to the chosen tab in the display region.

33. The mobile terminal of claim 22, wherein the controller is configured to display a current location of the mobile terminal on the schedule map.

34. The mobile terminal of claim 33, wherein the controller is configured to move the schedule map or change a scale of the schedule map in accordance with a change in the current location of the mobile terminal.

35. The mobile terminal of claim 22, wherein the controller is configured to display a part of the schedule map corresponding to a current location of the mobile terminal on an idle screen or in a popup window at regular intervals of time.

36. The mobile terminal of claim 22, further comprising:
a gyro sensor, wherein the controller is configured to
determine whether a gyro signal indicating the movement of the mobile terminal has been generated by the gyro sensor; and
rotate the schedule map in accordance with a direction of the movement of the mobile terminal based on motion information extracted from the gyro signal.

37. The mobile terminal of claim 22, wherein the controller is configured to
determine that a command to transmit the schedule map has been issued; and
execute an application for sending a message or email to a phone number or an email address received along with the command to transmit the schedule map.

38. The mobile terminal of claim 22, wherein the schedule information includes one of an event importance, an event type, information regarding parties of the scheduled event, information indicating whether the scheduled event has been adjusted, information indicating whether the scheduled event has already been completed, an optimal route to the place, the current location information and the traffic information.

39. The mobile terminal of claim 38, wherein the traffic information includes at least one of traffic condition information of the place, information indicating a mode of transportation available or recommended, an estimated time to get to the place, information indicating whether the user can arrive at one of the schedule places on corresponding schedule, and address or other location information of the one of the schedule places.

40. The mobile terminal of claim 22, wherein the schedule adjustment information includes at least one of information for postponing a scheduled event, information for changing a time of the scheduled event, information for changing a place of the scheduled event, and information for canceling the scheduled event and information indicating a recommended or available mode of transportation.

41. The mobile terminal of claim 40, wherein the controller is configured to adjust the scheduled event by postponing the scheduled event, change the time of the scheduled event, change the place of the scheduled event, or cancel the scheduled event.

42. The mobile terminal of claim 41, wherein the controller is configured to, when a schedule adjustment is performed on the scheduled event, either transmit adjusted schedule information to parties of the adjusted scheduled event by sending a message or email or request a call.

43. The method of claim 1, further comprising:
deleting an event from the schedule based on another user input to one of the schedule map and the displayed schedule;
updating the schedule map by removing a flag representing the deleted event and deleting corresponding schedule information from the schedule;
rearranging the rearranged route displayed on the schedule map to omit the deleted place and generate a second rearranged route;
displaying the second rearranged route; and
determining whether the user can arrive at each of the plural schedule places in the second rearranged route at the corresponding scheduled time based on the traffic information and producing a third determination result.

44. The mobile terminal of claim 22, wherein the controller is configured to
delete an event from the schedule based on another user input to one of the schedule map and the displayed schedule;
update the schedule map by removing a flag representing the deleted event and delete corresponding schedule information from the schedule;
rearrange the rearranged route displayed on the schedule map to omit the deleted place and generate a second rearranged route;
display the second rearranged route; and
determine whether the user can arrive at each of the plural schedule places in the second rearranged route at the corresponding scheduled time based on the traffic information and produce a third determination result.

* * * * *